US012602503B2

(12) United States Patent
Janzen et al.

(10) Patent No.: US 12,602,503 B2
(45) Date of Patent: *Apr. 14, 2026

(54) GENERATING, FROM DATA OF FIRST LOCATION ON SURFACE, DATA FOR ALTERNATE BUT EQUIVALENT SECOND LOCATION ON THE SURFACE

(71) Applicant: Avalara, Inc., Seattle, WA (US)

(72) Inventors: Mark Janzen, Seattle, WA (US); Gregory T. Kavounas, Bellevue, WA (US); Rohit Ghule, Seattle, WA (US); Charles M. Morrisette, Everett, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,673

(22) Filed: Jan. 29, 2025

(65) Prior Publication Data

US 2025/0173454 A1      May 29, 2025

Related U.S. Application Data

(63) Continuation of application No. 18/223,930, filed on Jul. 19, 2023, now Pat. No. 12,242,631, which is a
(Continued)

(51) Int. Cl.
*G06F 17/00* (2019.01)
*G06F 7/00* (2006.01)
(Continued)

(52) U.S. Cl.
CPC ...... *G06F 21/6218* (2013.01); *G06F 16/9537* (2019.01)

(58) Field of Classification Search
CPC ......................... G06F 21/6218; G06F 16/9537
(Continued)

(56) References Cited

U.S. PATENT DOCUMENTS 6,327,535 B1 * 12/2001 Evans ...................... G01S 1/68
342/357.59
7,783,536 B2      8/2010 William et al.
(Continued)

FOREIGN PATENT DOCUMENTS

WO      2018/200043 A1      11/2018
WO      2018/201104 A1      11/2018

OTHER PUBLICATIONS

International Preliminary Report on Patentability received for PCT Patent Application No. PCT/US20/027039, mailed on Dec. 23, 2021, 10 pages.
(Continued)

*Primary Examiner* — Pavan Mamillapalli
(74) *Attorney, Agent, or Firm* — Jeremiah J. Bauanch; Frontier IP Law PLLC

(57) ABSTRACT

In embodiments, given a surface that has domains on it and a first location, a second location is generated in the surface. The second location belongs in the same domains as the first location, and does not belong in the same domains as the second location. An advantage can be that, in embodiments, the second location can be used in lieu of the first location. A use case can be where it is desired to protect the privacy of location data of an entity, such as its address.

39 Claims, 17 Drawing Sheets

Related U.S. Application Data continuation of application No. 16/824,344, filed on Mar. 19, 2020, now Pat. No. 11,748,363.

(60) Provisional application No. 62/970,067, filed on Feb. 4, 2020, provisional application No. 62/916,060, filed on Oct. 16, 2019, provisional application No. 62/861,694, filed on Jun. 14, 2019.

(51) Int. Cl.
  *G06F 16/9537*     (2019.01)
  *G06F 21/62*      (2013.01)

(58) Field of Classification Search
  USPC .......................................................... 707/722
  See application file for complete search history.

(56)              References Cited

U.S. PATENT DOCUMENTS

| | | | |
|---|---|---|---|
| 7,933,803 | B1 | 4/2011 | Nadler et al. |
| 8,620,578 | B1 | 12/2013 | Brown et al. |
| 8,725,407 | B2 | 5/2014 | Hurley et al. |
| 9,760,915 | B2 | 9/2017 | Pavlou et al. |
| 10,445,818 | B1 | 10/2019 | Chowdhary |
| 10,769,611 | B2 | 9/2020 | McNeel |
| 11,386,097 | B2 * | 7/2022 | Young .............. G06F 16/24578 |
| 11,748,363 | B2 * | 9/2023 | Janzen ................ G06F 21/6254 |
| | | | 707/722 |
| 12,242,631 | B2 * | 3/2025 | Janzen ................ G06F 16/9537 |
| 2002/0124067 | A1 * | 9/2002 | Parupudi ................. G06F 21/62 |
| | | | 709/238 |
| 2002/0138765 | A1 | 9/2002 | Fishman et al. |
| 2007/0136158 | A1 | 6/2007 | Rawlings et al. |
| 2007/0136159 | A1 | 6/2007 | Rawlings et al. |
| 2013/0013471 | A1 | 1/2013 | Fishman |
| 2021/0383392 | A1 * | 12/2021 | Edwards .............. G06Q 50/265 |
| 2023/0358542 | A1 | 11/2023 | Janzen et al. |
| 2023/0367893 | A1 | 11/2023 | Janzen et al. |

OTHER PUBLICATIONS

International Search Report and Written Opinion received for PCT Patent Application No. PCT/US20/027039, mailed on Jun. 25, 2020, 11 pages.

* cited by examiner

300

| | 221 A' | 222 B' | 223 C' | 224 D' | 225 E' | 351 MATCH? | 352 BEST CHOICE? |
|---|---|---|---|---|---|---|---|
| 211 AL: | ✔ | ✔ | ✘ | ✘ | ✘ | ✕ | ✕ |
| 340 DOMAIN SUBSETS | 341 FIRST SUBSET | | 342 SECOND SUBSET | | | ✕ | ✕ |
| 231 CL1 | ✔ | ✔ | ✘ | ✘ | ✘ | ✔ | ✘ |
| 232 CL2 | ✔ | ✔ | ✔ | ✘ | ✘ | ✘ | ✕ |
| 233 CL3 | ✔ | ✔ | ✘ | ✘ | ✘ | ✔ | ✔ 233 SL |
| 234 CL4 | ✔ | ✘ | ✘ | ✘ | ✔ | ✘ | ✕ |
| 235 CL5 | ✔ | ✘ | ✘ | ✘ | ✘ | ✘ | ✕ |
| 236 CL6 | ✘ | ✘ | ✘ | ✔ | ✔ | ✘ | ✕ |

FIG. 3

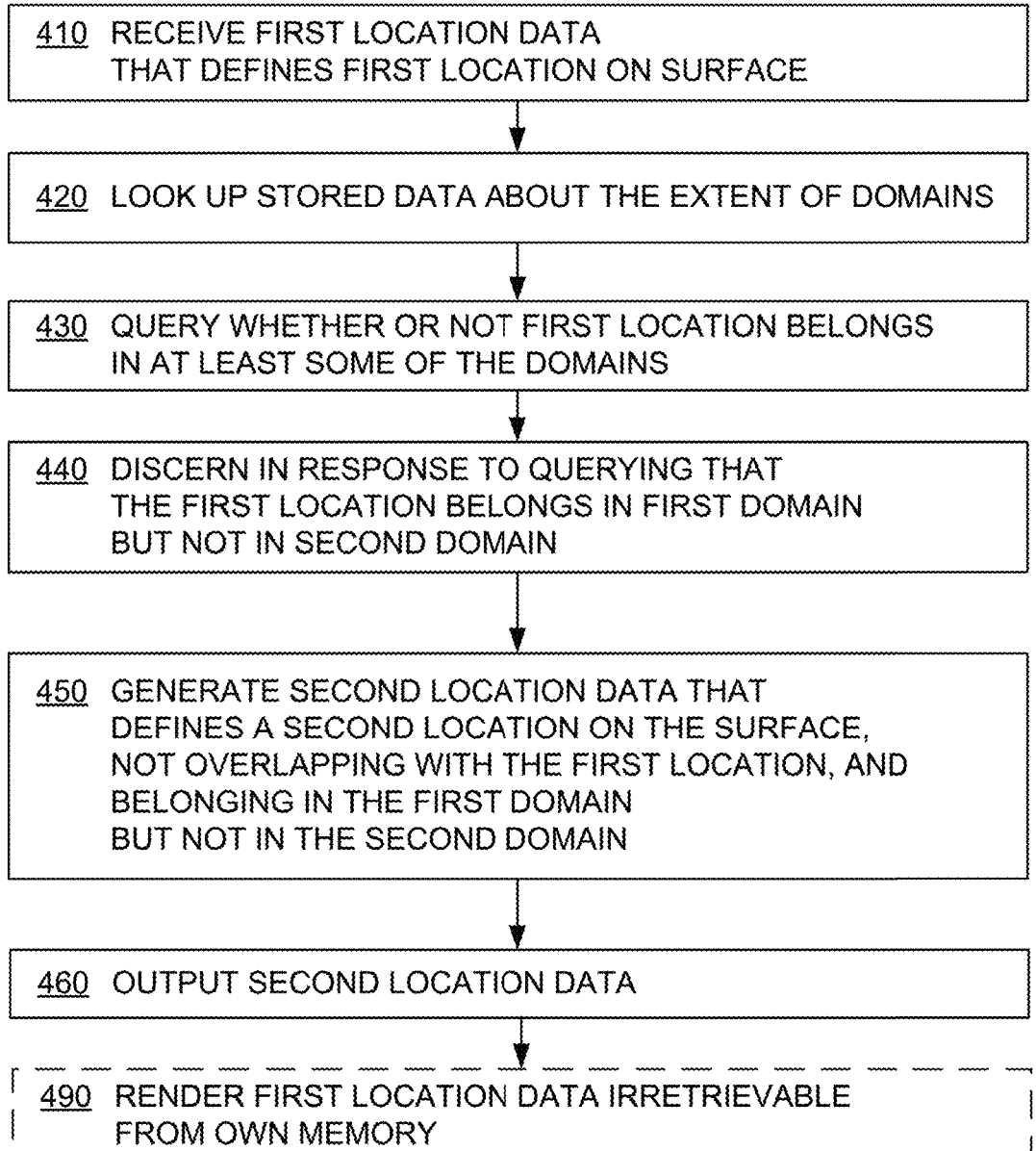

400

410  RECEIVE FIRST LOCATION DATA
     THAT DEFINES FIRST LOCATION ON SURFACE

420  LOOK UP STORED DATA ABOUT THE EXTENT OF DOMAINS

430  QUERY WHETHER OR NOT FIRST LOCATION BELONGS
     IN AT LEAST SOME OF THE DOMAINS

440  DISCERN IN RESPONSE TO QUERYING THAT
     THE FIRST LOCATION BELONGS IN FIRST DOMAIN
     BUT NOT IN SECOND DOMAIN

450  GENERATE SECOND LOCATION DATA THAT
     DEFINES A SECOND LOCATION ON THE SURFACE,
     NOT OVERLAPPING WITH THE FIRST LOCATION, AND
     BELONGING IN THE FIRST DOMAIN
     BUT NOT IN THE SECOND DOMAIN

460  OUTPUT SECOND LOCATION DATA

490  RENDER FIRST LOCATION DATA IRRETRIEVABLE
     FROM OWN MEMORY

FIG. 4                          _METHODS_

_SAMPLE USE CASE – TRANSACTION DATA_
_USED FOR SALES TAX COMPUTATION_

1200

1296

1210

1220

SETTINGS – CUSTOMER PRIVACY

Conceal names?

☑ always    ☐ only when required by jurisdiction

☐ never    ☐ only when customer has requested

Disguise addresses?

☑ always    ☐ only when required by jurisdiction

☐ never    ☐ only when customer has requested

Back    1230

Done    1240

*SAMPLE SETTINGS*
*FOR USE CASE*

GENERATING, FROM DATA OF FIRST LOCATION ON SURFACE, DATA FOR ALTERNATE BUT EQUIVALENT SECOND LOCATION ON THE SURFACE

CROSS REFERENCE TO RELATED PATENT APPLICATIONS

This continuation patent application claims priority from U.S. patent application Ser. No. 18/223,930, filed Jul. 19, 2023, which is a continuation of Ser. No. 16/824,344 filed on Mar. 19, 2020, which also claims priority from U.S. Provisional Patent Application No. 62/861,694 filed on Jun. 14, 2019, and also from U.S. Provisional Patent Application No. 62/916,060 filed on Oct. 16, 2019, and also from U.S. Provisional Patent Application No. 62/970,067 filed on Feb. 4, 2020.

BRIEF SUMMARY

The present description gives instances of computer systems, storage media that may store programs, and methods, the use of which may help overcome problems and limitations of the prior art.

In embodiments, given a surface that has domains on it, a computer system may receive first location data that defines a first location on the surface. The computer system may then look up stored data about the extent of the domains on the surface, and query whether or not the first location belongs in at least some of the domains. In response to the querying, the computer system may discern that the first location belongs in a first one of the domains, but does not belong in a second one of the domains. The computer system may then generate second location data that defines a second location on the surface. The second location may be selected to be an alternate to the first location, and in fact to not overlap with the first location. The second location may be further selected to belong in the first domain but to not belong in the second domain. Then the computer system may output the second location data.

An advantage can be that, in embodiments, the second location can be used in lieu of the first location. A use case can be where it is desired to protect the privacy of location data of an entity, such as its address.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 3 is a table according to embodiments that describes relationships between the sample locations and the sample domains in the lower diagram of FIG. 2.

FIG. 4 is a flowchart for illustrating sample methods according to embodiments.

DETAILED DESCRIPTION

As has been mentioned, the present description is about generating a second location on a surface from a first location. Embodiments are now described in more detail.

Figure 1:
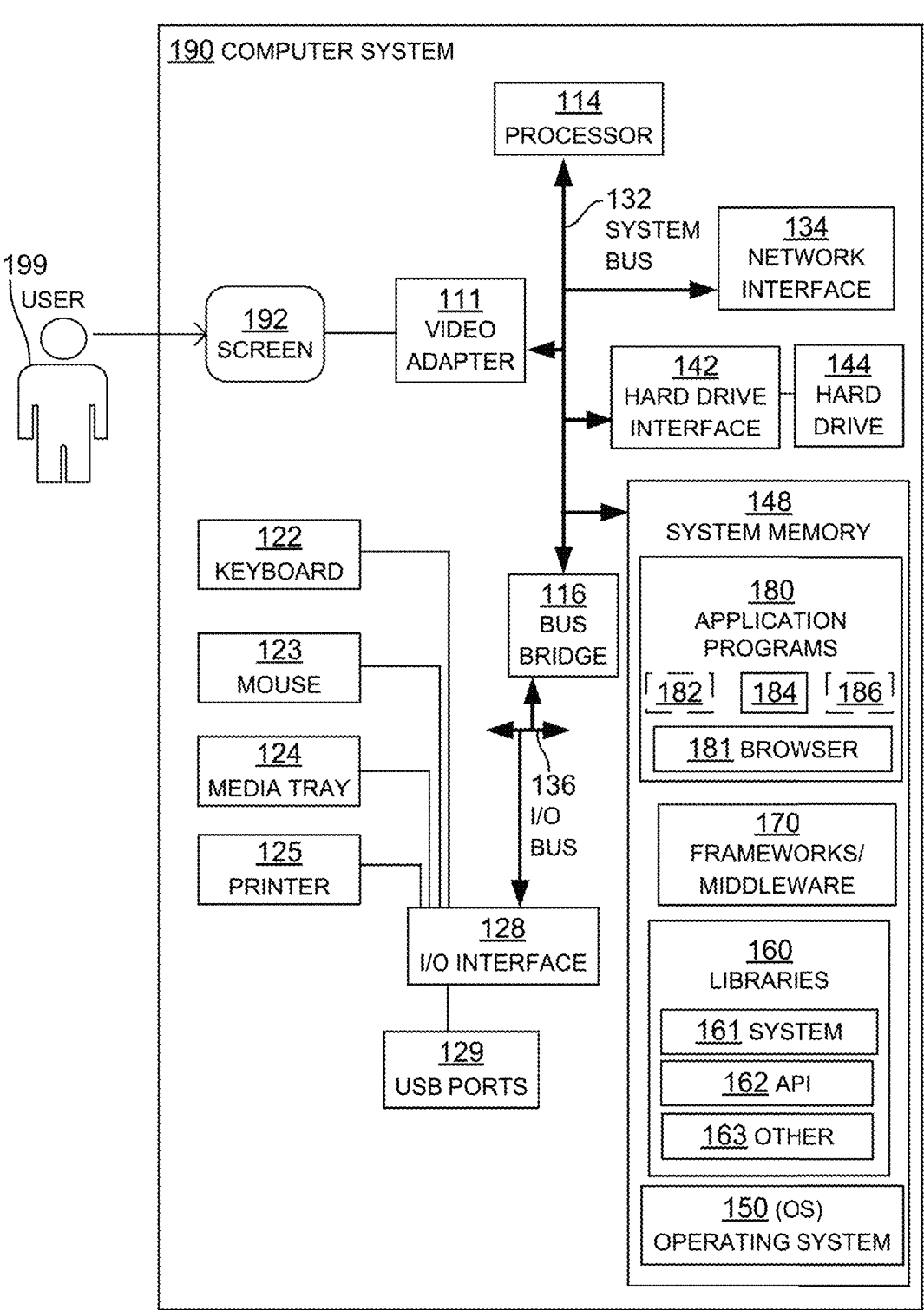
FIG. 1 is a block diagram of a sample computer system according to embodiments.

FIG. 1 shows details for a sample computer system 190, optionally used locally by a user 199. Computer system 190 may be a desktop computer, a laptop computer, a tablet computer, a mobile phone, and so on. In embodiments, computer system 190 is a server or part of a server that is not usually accessed locally by a user, as will be seen in examples later in this document.

Computer system 190 includes a processor 114. Computer system 190 also includes a system bus 132 that is coupled to processor 114. System bus 132 can be used by processor 114 to control and/or communicate with other components of computer system 190.

Computer system 190 additionally optionally includes a network interface 134 that is coupled to system bus 132. Network interface 134 can be used to access a communications network, as will be seen in the example of FIG. 2. Network interface 134 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

Computer system 190 further includes a video adapter 111, which is also coupled to system bus 132. Video adapter 111 may be able to drive and/or support a screen 192 that is used by user 199 together with computer system 190.

In addition to screen 192, other peripheral input/output (I/O) devices that may be used together with computer system 190 include a keyboard 122, a mouse 123, a media tray 124 and a printer 125. Media tray 124 may include storage devices such as CD-ROM drives, multi-media interfaces, and so on. Computer system 190 moreover includes an I/O interface 128 connected to these peripheral I/O devices as shown, for the purpose of communicating with them. In this example these connections are direct. Alternately, one or more of these connections may take place via universal serial bus (USB) ports 129 of computer system 190, to which I/O interface 128 is also connected.

Computer system 190 moreover includes a bus bridge 116 coupled to system bus 132, and an input/output (I/O) bus 136. I/O bus 136 is coupled to bus bridge 116 and to I/O interface 128.

Computer system 190 also includes various memory components. A non-volatile memory component is a hard drive 144. Computer system 190 further includes a hard drive interface 142 that is coupled to hard drive 144 and system bus 132.

Additional memory components are in a system memory 148, which is also coupled to system bus 132. System memory includes volatile memory including, but not limited to, cache memory, registers and buffers. In embodiments, data from hard drive 144 populates registers of the volatile memory of system memory 148.

Sample system memory 148 has a software architecture that uses a stack of layers, with each layer providing a particular functionality. In this example the layers include—starting from the bottom—an operating system (OS) 150, libraries 160, frameworks/middleware 170 and application programs 180. Other software architectures may include less, more or different layers. For example, a presentation layer may also be included. For another example, some mobile or special purpose operating systems may not provide a frameworks/middleware 170.

OS 150 may manage hardware resources and provide common services. Libraries 160 provide a common infrastructure that is used by applications 180 and/or other components and/or layers. Libraries 160 provide functionality that allows other software components to perform tasks more easily fashion than to interface directly with the specific underlying functionality of OS 150. Libraries 160 may include system libraries 161, such as a C standard library. System libraries 161 may provide functions such as memory allocation functions, string manipulation functions, mathematical functions, and the like.

In addition, libraries 160 may include API libraries 162 and other libraries 163. API libraries 162 may include media libraries, such as libraries to support presentation and manipulation of various media formats such as MPREG4, H.264, MP3, AAC, AMR, JPG, and PNG. API libraries 162 may also include graphics libraries, for instance an OpenGL framework that may be used to render 2D and 3D in a graphic content on screen 192. API libraries 162 may further include database libraries, for instance SQLite, which may support various relational database functions. API libraries 162 may additionally include web libraries, for instance WebKit, which may support web browsing functionality.

Frameworks/middleware 170 may provide a higher-level common infrastructure that may be used by applications 180 and/or other software components/modules. For example, frameworks/middleware 170 may provide various graphic user interface (GUI) functions, high-level resource management, high-level location services, and so forth. Frameworks/middleware 170 may provide a broad spectrum of other APIs that may be used by applications 180 and/or other software components/modules, some of which may be specific to OS 150 or to a platform.

Application programs 180 are also known more simply as applications and apps. One such app is a browser 181. Browser 181 is an example of a renderer, which includes program modules and instructions that enable computer system 190, to exchange network messages with a network using hypertext transfer protocol (HTTP) messaging.

In embodiments, application programs 180 include a second location generator 184. Optionally, application programs 180 may further include a first location data converter 182 and a second location data converter 186. These can be made to perform operations as described later in this document.

Other such applications 180 may include a contacts application, a book reader application, a location application, a media application, a messaging application, and so on. Applications 180 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 180 may use built-in functions of OS 150, libraries 160, and frameworks/middleware 170 to create user interfaces for user 199 to interact with.

The hardware elements depicted in computer system 190 are not intended to be exhaustive. Rather, they are representative, for highlighting essential components that can be used with embodiments.

Instructions for performing any of the methods or functions described herein may be stored, completely or partially, within the memory components of computer system 190, etc. These memory components include the indicated memory components, plus cache memory within the processors such as processor 114. Accordingly, these memory components are examples of machine-readable media.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 114 is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Figure 2:
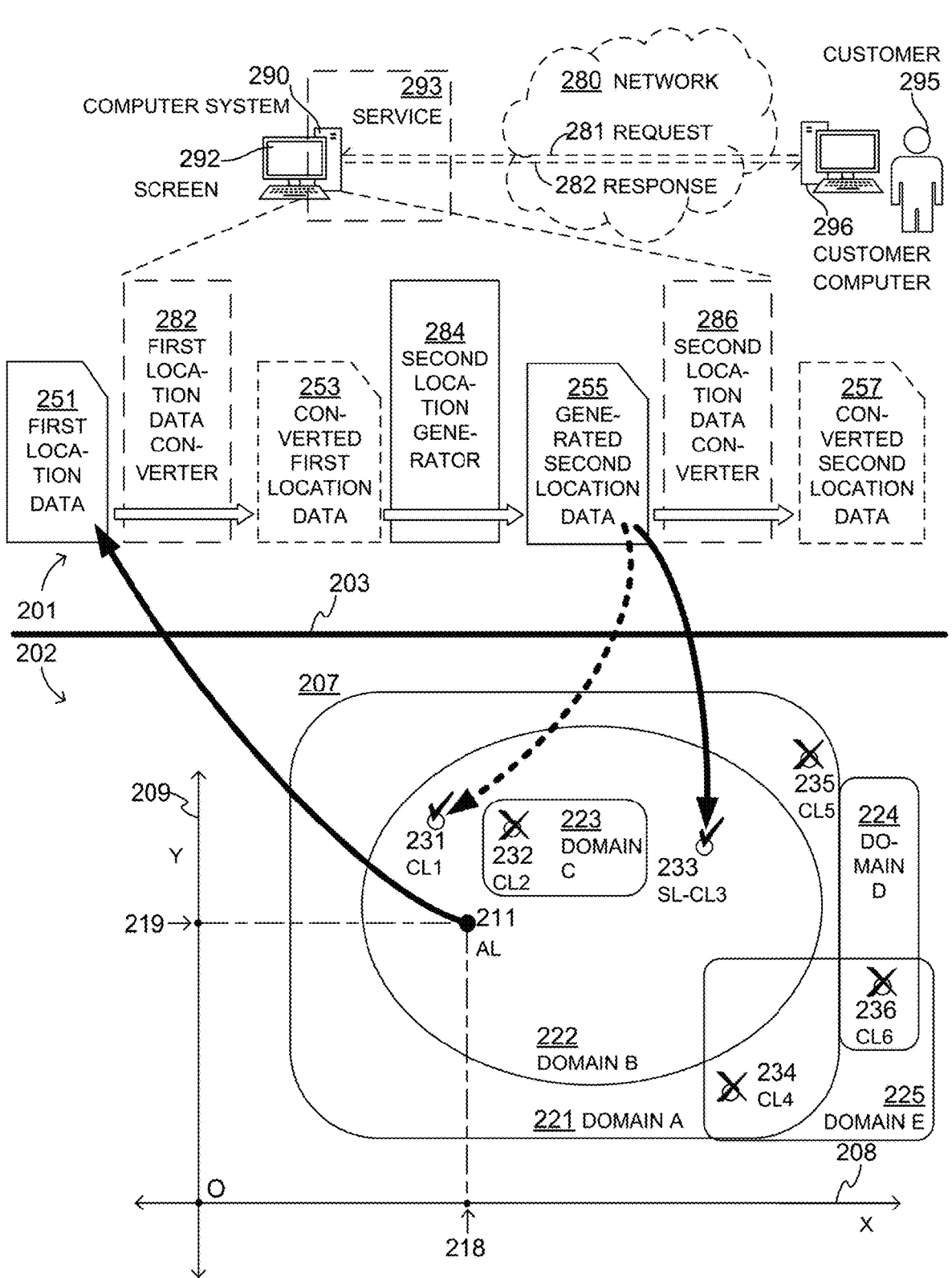
FIG. 2 presents two separate but related diagrams: the upper diagram shows components of a sample computer system according to embodiments; the lower diagram shows a surface with domains and locations on it according to embodiments; and arrows show salient conceptual connections between the two diagrams.

FIG. 2 presents a first upper diagram 201 and a second lower diagram 202 that are separated by a separator line 203. The diagrams 201 and 202 are linked by arrows that cross the separator line 203, and show salient conceptual connections between these two diagrams.

The first diagram 201 shows aspects of a sample computer system 290 according to embodiments. In terms of context, in some embodiments the computer system 290 is part of an online service 293, which can be a software as a service (SaaS). A customer 295 who uses a customer computer 296 may access the computer system 290 via a communications network 280, such as the internet. Such accessing can be for example, by transmitting a request 281, and then receiving a response 282 in response to the request 281, and so on.

The computer system 290 may be made in a number of ways including, for example as was described for the computer system 190. In some embodiments, the computer system 290 is provided with a screen 292, although not necessarily if the computer system 290 is a server and/or part of online service 293.

In embodiments, as also indicated with slanted dashed lines, the computer system 290 includes a second location generator 284. Optionally, the computer system 290 may further include a first location data converter 282 and a second location data converter 286. First location data converter 282, second location generator 284, and second location data converter 286 may be implemented in a number of ways, for example as shown in FIG. 1 by applications 182, 184, 186 respectively.

The second diagram 202 shows a surface 207. The surface 207 may be flat, or even curved. The surface 207 may even be substantially spherical; if the underlying radius is large enough, then at certain small areas the surface 207 may be considered as flat.

A first location AL 211 is shown on the surface 207. The first location AL 211 is also known as the initial location. Locations such as first location AL 211 can be defined on the surface 207 as data that uses a system suitable for describing places on the surface 207. For example, such data may use a system of rectangular coordinates, or spherical coordinates, etc. In this particular case, a system of rectangular axes X 208 and Y 209 is shown. These axes X 208 and Y 209 intersect at an origin O. And, if first location AL 211 is a single point, it can be defined by data that are coordinate values of points 218, 219 on axes X 208 and Y 209, respectively. Other coordinate systems may also be used, and first location AL 211 need not be a single point, as will be described later in more detail.

The surface 207 has a plurality of domains defined thereon. In this example the following sample domains are shown: domain A 221, domain B 222, domain C 223, domain D 224, and domain E 225. As can be seen, some of these domains are supersets or subsets of each other, some exclude each other, and some overlap with others.

The extent of these domains 221, . . . , 226 on the surface 207 can be described as data of boundaries of the domains. For example the data for the boundaries can use a coordinate system, such as the same coordinate system used for the locations, although that is not necessary. And that boundaries data can be stored in a computer system such as computer system 290 of diagram 201.

Additional sample locations are shown on the surface 207. For reasons that will be understood later, many of these locations are candidate locations, and are indicated as "CL". These additional locations include CL1 231, CL2 232, CL3 233, CL4 234, CL5 235 and CL6 236. The relationship between these additional locations and the domains is now described in more detail.

FIG. 3 shows a table 300, which has rows and columns. Some of the rows and columns define cells that show relationships between the domains A 221, . . . , E 225 with the locations AL 211, CL1 231, . . . , CL6 236 of diagram 202 in FIG. 2. Additional rows and additional columns are also described later.

Most of the cells of table 300 have checkmarks (V) or crossed-out marks (X). The checkmarks are for when one of the locations belongs in the corresponding domain, while the crossed-out marks are for when that location does not belong in the corresponding domain. For example, from diagram 202 it will be seen that location AL 211 belongs in domains A and B, but not in domains C, D or E. Accordingly, the row of table 300 for location AL 211 has two checkmarks followed by three crossed-out marks. And so, according to an additional row 340, domains A, B, are a first subset 341 of the domains, while domains C, D and E are a second subset 342 of the domains.

From the entries of table 300, therefore, it can be determined which of candidate locations CL1 231, . . . , CL6 236 belong in the same domains as first location AL 211, and which do not. In particular, it can be seen from table 300 that only candidate locations CL1 231 and CL3 233 belong in exactly the same domains as first location AL 211, which is a condition called matching. This matching could also be determined by inspection of the surface 207 of FIG. 2. Returning to FIG. 3, this matching is reflected in table 300 in an additional column 351, which shows checkmarks for matching and crossed-out marks for not matching. These marks of column 351 for individual locations are also repeated on the corresponding locations of diagram 202.

Returning to FIG. 3, according to an additional column 352, a best choice is made among only the matching candidate locations CL1, CL3. The best choice can be made according to one or more criteria. In this example, the best choice was CL3, which is why it can also be called the selected location (SL). And, yes, as will be seen later in this document, in some instances the best choice is the one farthest away from the first location AL 211.

FIG. 4 shows a flowchart 400 for describing methods according to embodiments. According to a first operation 410, first location data can be received by a computer system. For instance, the computer system may be computer system 290 of FIG. 2, receiving first location data 251. First location data 251 is shown formatted as a document in the example of diagram 201, but this kind of formatting is not necessary for embodiments. First location data 251 may define first location AL 211 on the surface 207, hence a solid arrow crossing line 203 from diagram 202 to diagram 201.

As also mentioned, the surface of operation 410 may have domains defined thereon, as does the surface 207. According to another operation 420, stored data about the extent of the domains may be looked up by the computer system. This could be the above-mentioned domain boundary data.

According to another operation 430, it may be queried, by the computer system, whether or not the first location belongs in at least some of the domains. Of course, the querying may be performed by using the first location data input at operation 410, and also optionally per the boundary data looked up at operation 420. In the example of diagram 201, the querying may be one of the functions performed by second location generator 284.

In some embodiments, the received first location data uses a first coordinate system, and the querying is performed from the first location data in the first coordinate system. In other embodiments, conversion is required, for example to a different coordinate system than the one that the first location data was received in. In particular, the received first location data may use a first coordinate system and, according to one more operation, the received first location data may be converted, by the computer system, so that the received first location data uses a second coordinate system that is distinct from the first coordinate system. Such a conversion can be performed, for example, by first location data converter 282, to generate converted first location data 253. In such embodiments, then, the querying of operation 430 can be performed using the converted first location data, which would be better useable by second location generator 284.

Then, according to another operation 440, it may be discerned, by the computer system, that the first location belongs in a first one of the domains but does not belong in a second one of the domains. The discerning of operation 440 can be performed in response to the querying of operation 430. For example, it may be discerned that the first location belongs in a first domain A but does not belong in a second domain E. As was seen from the coverage of table 300, the requirement can be extended to query with respect to additional domains, and even all the domains.

Operations 430 and 440 may be performed in a number of ways. For example, in view of FIG. 2, a test line may be traced on surface 207 that passes through point AL 211. Then it may be queried which domain boundaries are crossed by the test line and, if so, where point AL 211 is with respect to them. If point AL 211 is between two crossed boundaries of a domain, then point AL 211 is within that domain, and belongs in it. Else point AL 211 does not belong in that domain. To simplify the computation, it may be preferred to use as a test line one that will produce a lot of zeroes. One choice is to extend the vertical line segment between point AL 211 and intercept 218, or the horizontal line segment between point AL 211 and intercept 219.

Returning to FIG. 4, according to another operation 450, second location data can be generated by the computer system. The second location data may define a second location on the surface. In diagram 201, the second location is generated by second location generator 284, and the generated second location data is indicated as 255. In embodiments, the second location is selected so as to not overlap with the first location, as will be explained later in this document. In embodiments, the second location is selected so as to belong in the first domain but to not belong in the second domain of operation 440, just as the first location.

As was seen from the coverage of table 300, in some embodiments a first subset 341 of all of the domains that the first location belongs in may be discerned by the computer system. This first subset could include the first domain of operation 440. In such embodiments, the second location may be further selected so as to belong in all the domains of the first subset 341.

Moreover, in some embodiments a second subset 342 of all of the domains that the first location does not belongs in may be discerned by the computer system. This second subset could include the second domain of operation 440. In such embodiments, the second location may be further selected so as to not belong in any the domains of the second subset 342. In the example of FIG. 3, the second subset 342 includes at least three domains C, D, E.

In some embodiments, the generated second location data uses a first coordinate system. In such embodiments, the method further includes: converting, by the computer system, the generated second location data so that it uses a second coordinate system, which is distinct from the first coordinate system. This conversion may be performed, for example, by second location data converter 286 of FIG. 2.

This component generates the converted second location data 257, which is output per the next operation.

None, one or both of converters 282, 286 may be used. As such, the first location data may use a first coordinate system, and the outputted second location data may also use the first coordinate system, or a second coordinate system that is distinct from the first coordinate system.

Returning to FIG. 4, according to another operation 460, the second location data may be output by the computer system. In some embodiments, outputting may be by a user interface to a user. In some embodiments, the first data is received by the computer system 290 via network 280 as a payload of a request 281. In such embodiments, the second location data 255 or 257 is output by the computer system 290 via network 280 as a payload of a response 282 that is transmitted responsive to the request 281.

In some embodiments, the first location data that has been received at operation 410 becomes temporarily stored in a memory of the computer system. In such embodiments, according to another, optional operation 490, the first location data is rendered irretrievable from the memory, by the computer system. This may be accomplished in a number of ways. For example, this data can be erased specifically from the memory, or the memory locations may be made available for overwriting or themselves erased from a memory, and so on. The operation of flowchart 400 may be performed many times, and so on.

More about the nature of the locations is now described. Returning to FIG. 2, locations 211, 231, 232, . . . , 236 are designated by small circles or dots, but that is only for convenience. In some embodiments, the locations are single points. In such embodiments, the location data, such as the first location data and/or the second location data, may use a certain coordinate system. That location data may also define a single point on the surface according to the certain coordinate system, the single point being the entire location. An example was mentioned above for location 211, treated as a point.

In other embodiments, the first location and/or the second location is a place. Being a place, it can have a non-zero area on the surface. Moreover, while small circles or dots are used in FIG. 2 to denote the locations, such places need not be have a circular perimeter. Examples are now described.

Figure 5:
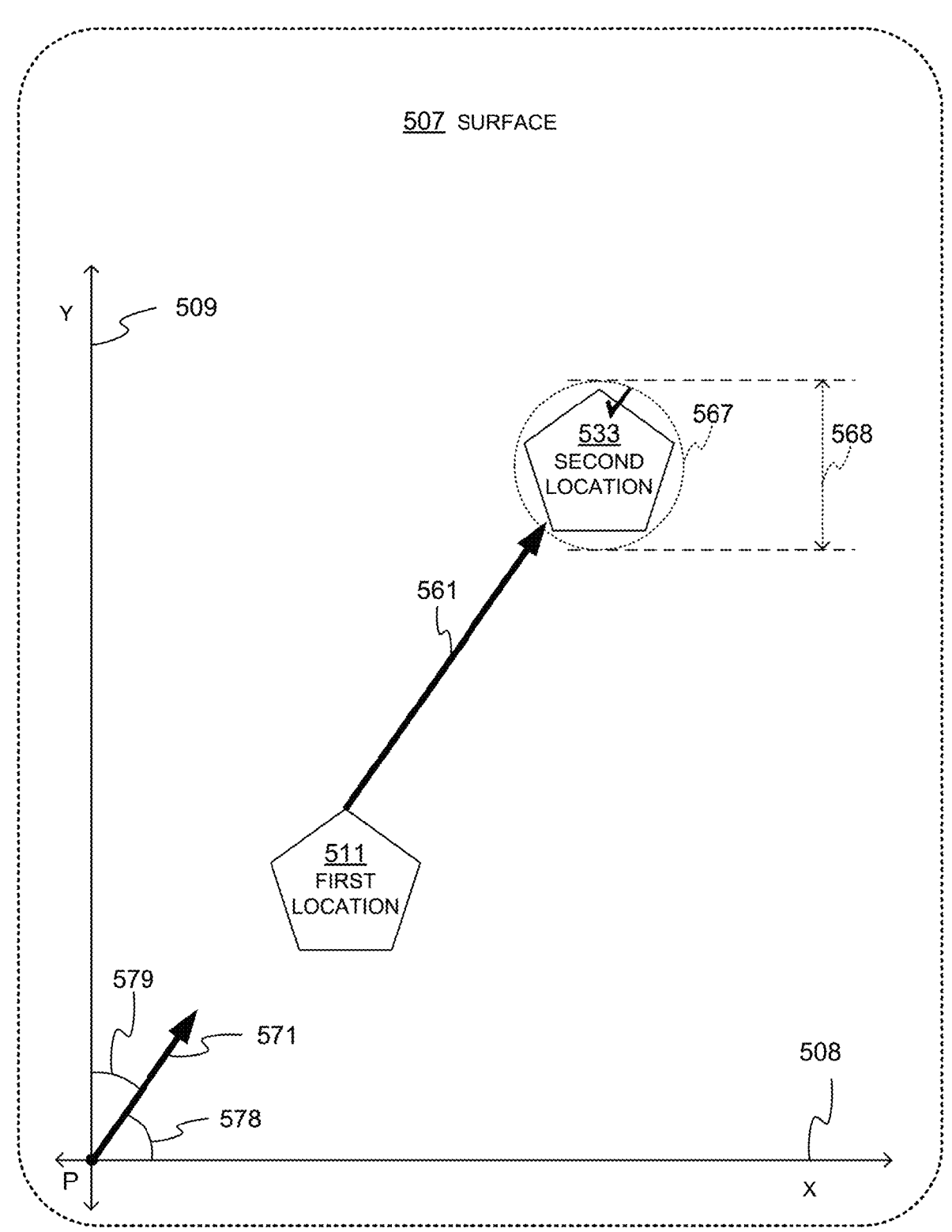
FIG. 5 is a diagram of a sample surface with sample locations that are places with non-zero area according to embodiments.

FIG. 5 is a diagram of a sample surface 507. A system of coordinate axes X 508 and Y 509 intersect at an origin point P. It is understood that the origin point P is transferable sometimes to other points of surface 507, with the axes X 508 and Y 509 following accordingly.

A sample first location 511 is shown, which has pentagonal shape in this example, although any shape is possible. The first location 511 has a non-zero area on the surface 507.

A sample second location 533 is shown, which also has pentagonal shape. There is no requirement, however, that the second location 533 have the same shape as the first location 511. The second location 533 also has a non-zero area on the surface 507.

In this example, the second location 533 has been generated with reference to the first location 511. In fact, it is an arrow 561, which is also known as a vector, that helped generate the second location 533 with reference to the first location 511, as will be further described later in this document. The second location 533 is shown with a checkmark because it is assumed selected by optionally having met one or more selection criteria, as will be described later in this document.

It will be appreciated that, in this and other examples, the second location 533 does not overlap with the first location

511. In fact, the second location 533 is at some distance from the first location 511. This distance can be quantified in a number of ways. As an example, one could consider the second location 533 being fitted entirely within an arbitrary adjustable test circle 567. The test circle 567 can be adjusted to be made as small as possible, while still circumscribing the entire second location 533. Then the test circle 567 would have a certain diameter 568. In this example, the test circle 567, and thus the entire second location 533 within it, can be farther from any point of the first location 511 than the certain diameter 568.

In some embodiments the surface includes a forbidden zone, and the first location is known to be prohibited from being in the forbidden zone. In such embodiments, the second location is selected to be in the forbidden zone. An example is now described.

Figure 6:
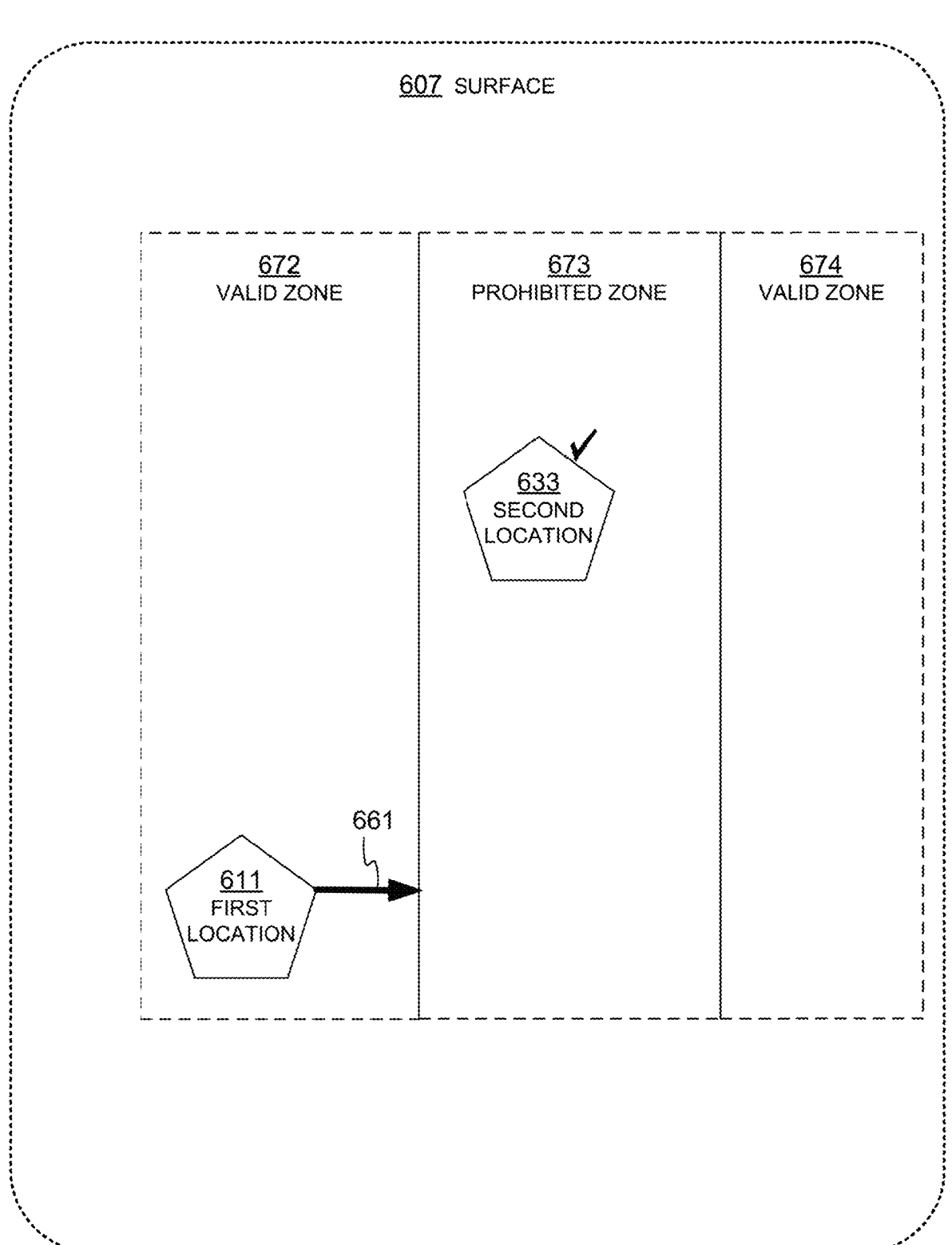
FIG. 6 is a diagram of a sample surface with sample zones valid for the first location, and a sample zone prohibited for the first location but still permissible for the second location according to embodiments.

FIG. 6 shows a sample surface 607. Two valid zones 672 and 674 are defined on the surface 607. Between the two valid zones 672 and 674 is a prohibited zone 673, which does not overlap with either of the two valid zones 672 and 674.

A sample first location 611 and a sample second location 633 are shown. In some embodiments, the first location 611 is known to be prohibited from being in the forbidden zone 673. In some embodiments, the first location 611 is required to be in one of the valid zones 672 and 674.

In this example, the second location 633 has been generated to be in prohibited zone 673. In fact, an arrow 661 points to forbidden zone 673. The second location 633 is shown with a checkmark because it is assumed selected by optionally having met one or more selection criteria, as will be described later in this document.

In some of these embodiments, stored data can be looked up that defines the valid zones on the surface, with the knowledge that the first location 611 is required to be in one of the valid zones. In this example, two adjacent ones of the valid zones 672, 674 are thus discovered from the looking up. In such embodiments, as in this example, the second location 633 can be selected to be between two adjacent ones of the valid zones 672, 674, to ensure that the second location 633 is not within either of the valid zones 672, 674. As such, the second location 633 is selected to be in prohibited zone 673.

The second location may be selected in a number of ways. In some of these ways there can be an effort to thwart someone who might try to determine the first location from knowing the second location. Accordingly, some of these ways involve an element of randomness, while others not. Examples are now described.

In some embodiments, the second location is selected by a generating function. In embodiments, the generating function uses the first location data to point to at least a vicinity for the second location. For example, as seen in FIG. 5, the generating function includes a vector 561 that starts from the first location 511, and points at a general vicinity. The second location 533 is within that vicinity. In some of these embodiments, the generating function uses the first location data to point to the second location more exactly. This does not happen exactly in the example of FIG. 5—but it would if the top point of second location 533 where aligned with the tip of vector 561. In instances, additional criteria may be applied to indicate where in the vicinity the second location 533 will be selected to be.

In such embodiments, the generating function may use at least one random variable. For one example, the generating function may force the second location to be within a certain range of distances from the first location. In embodiments that use vector 561, this can be accomplished by vector 561 having a range of permitted lengths.

For another example, the generating function may force the second location to be at a certain general direction from the first location. That general direction could be the direction of vector 561. That general direction may be always the same, or selected randomly, or quasi-randomly. As an example of such quasi-randomness, the first location data may use a coordinate system that employs the two perpendicular axes X 508 and Y 509. In addition, the generating function may force the second location to be at a certain general direction 571 from the first location. The certain general direction 571 is replicated as vector 561. In addition, the certain general direction 571 is at a random angle that is at least 20 degrees away from each of the axes. In other words, each of angles 578, 579 away from axes X 508 and Y 509 is at least 20 degrees. In this particular case, angle 578 is 55 degrees.

As already suggested above, in some embodiments the second location is chosen in more than one operations. For example, generating the second location data may include choosing, by the computer system, candidate location data that defines a candidate location on the surface. For instance, as already suggested above, the candidate location may be selected by a generating function that uses the first location data. The candidate location therefore may become the second location itself if the selection criterion is met. In addition, the candidate location can be in a forbidden zone, as mentioned above. In such embodiments, as a second operation, it may be determined by the computer system, whether or not the candidate location data meets a selection criterion, and the candidate location data can be generated as the second location data responsive to the candidate location meeting the selection criterion. Of course, and as seen in FIGS. 2 and 3, the selection criterion would include that the candidate location belongs in the first domain but does not belong in the second domain. Equivalently, the latter requirement can be enforced at the time that the candidate location data is generated, by choosing candidate location data only from the desired domains.

In some embodiments, it may be identified in advance that certain locations are desirable to use as the second location. Such locations may even be in a prohibited zone. In such embodiments, there can be further storing the candidate location data by the computer system. The storing can be in a memory of the computer system and prior to receiving the first location data.

Moreover, a plurality of candidate locations may be chosen. In particular, and still referring to FIG. 2, generating the second location data may include choosing, by the computer system, a plurality of candidate location data 231 and 233 that respectively define candidate locations on the surface 207. In some embodiments, the candidate locations are selected by a generating function that uses the first location data. Plus, similarly with a single candidate location, the plurality of candidate location data can be stored in advance, and then looked up. In addition, one or more of the candidate locations can be in a forbidden zone, as mentioned above.

In such embodiments, there can be ranking, by the computer system, of the plurality of the candidate locations according to at least one desirability criterion, and the second location may be selected as the one of the candidate locations that has been thus ranked the highest. The result of such a sample ranking is seen in FIG. 3, column 352. Again, the desirability criterion may already include that the candidate location should belong in the first domain but not in the second domain, which is one way of assigning the checkmarks in match column 351.

There are a number of possible criteria for such ranking. For example, a candidate location's distance along the surface from the first location 211 may be maximized, or kept at certain range. For another example, if default locations are used for the second location, the number of times that such default locations have been used may contribute to the ranking. That number can be to maximize the use of one such default location over others, or to maintain numbers approximately equal among default locations. Plus, there can be combinations of criteria, and so on.

Figure 7:
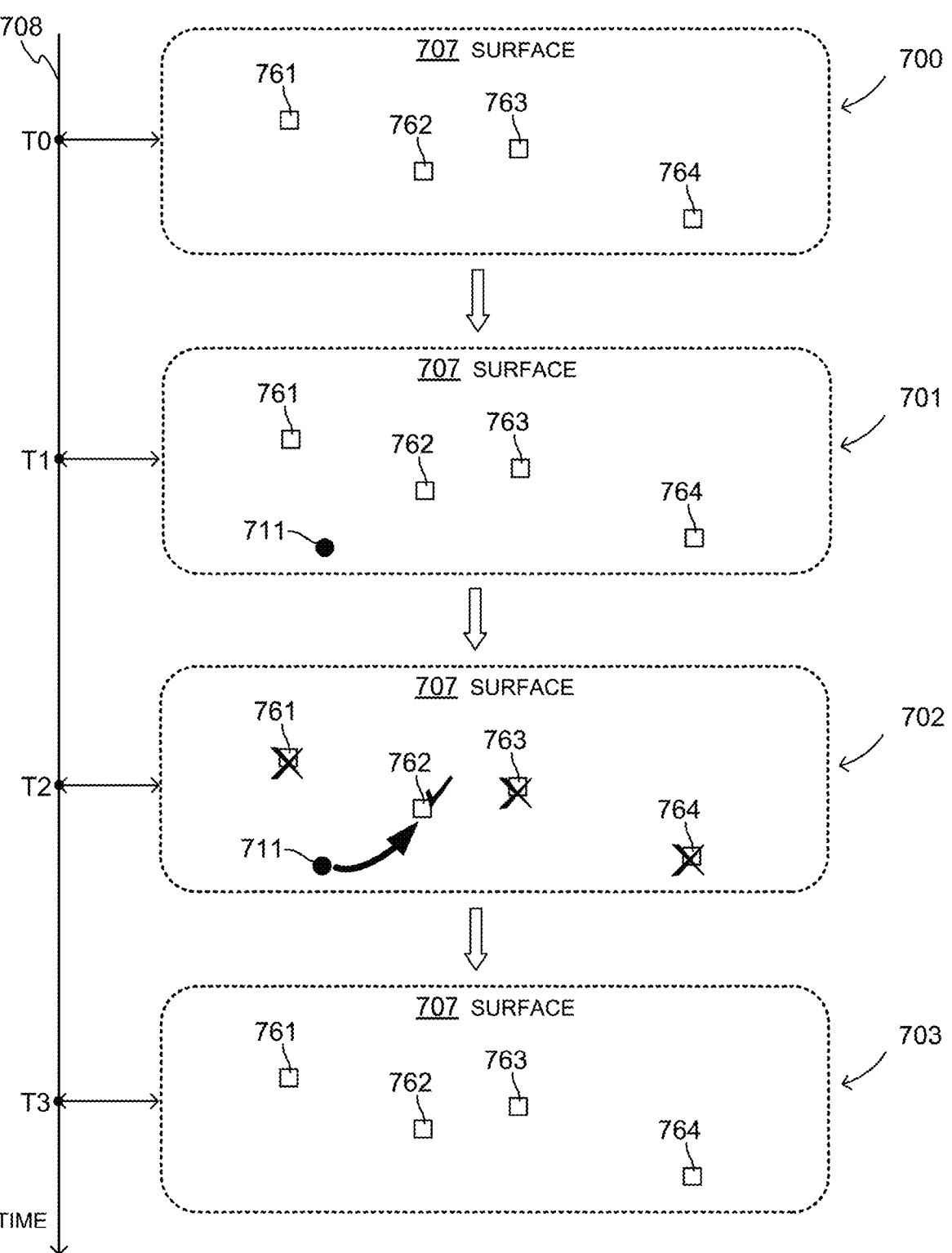
FIG. 7 shows a vertical time axis with successive snapshots of a surface with stored default locations being used as candidates for selecting the second location, according to embodiments.

Another example is now described for how prior-stored default locations may be used as candidates available for selecting the second location. FIG. 7 shows a vertical time axis 708 with times T0, T1, T2, T3. Also shown are respective snapshots 700, 701, 702, 703 of a surface 707 for each of those times.

Time T0 may take place before the first location data is received, in other words, before operation 410 of FIG. 4. Snapshot 700 shows default locations 761, 762, 763, 764 stored as candidate locations available for being selected as the second location.

At a subsequent time T1, the first location data has been received, for example according to operation 410. As such, snapshot 701 shows the first location as a dot 711. All stored default locations 761, 762, 763, 764 are still available, and shown as such.

At a subsequent time T2, default location 762 has been chosen as the selected second location, as an example of operation 450. As such, snapshot 702 shows default location 762 with a checkmark. In addition, an arrow indicates that, for first location 711, second location 762 is being selected. The remaining default locations 761, 763, 764 have not been selected, and therefore are shown with crossed-out marks.

At a subsequent time T3, the second location has been communicated, as an example of operation 460. In addition, the data of the first location 711 has been erased, as an example of operation 490 actually taking place. In addition, the next first location data is waited for. As such, time T3 is similar with time T0, which is why snapshot 703 is identical to snapshot 700. In particular, snapshot 703 shows default locations 761, 762, 763, 764 stored as candidate locations available for the next second location.

In the example of FIG. 7 there was no updating of the default locations with the eventual second location. That was partly due to the fact one of the default locations themselves was the selected second location.

In other embodiments, a plurality of default location data may be stored by the computer system in a memory of the computer system. The plurality of default location data may define a plurality of default locations on the surface. In such embodiments, when the second location is not any of the default locations, the second location data may be stored as additional default data in the memory of the computer system, for the next time operation 400 is performed. An example is now described.

Figure 8:
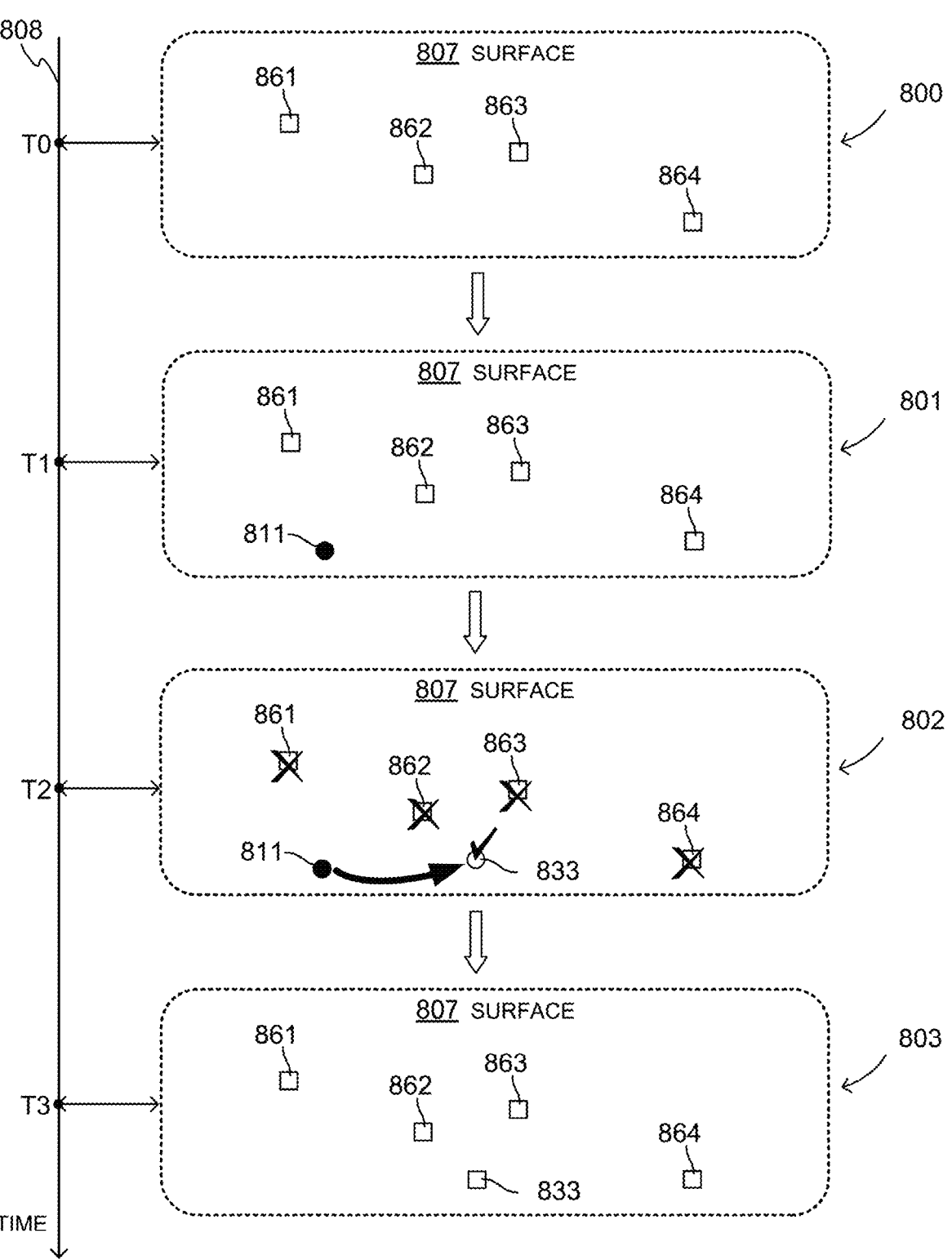
FIG. 8 shows a vertical time axis with successive snapshots of a surface with stored default locations being used as candidates for selecting the second location, according to embodiments.

FIG. 8 shows a vertical time axis 808 with times T0, T1, T2, T3. Also shown are respective snapshots 800, 801, 802, 803 of a surface 807 for each of those times.

Time T0 may take place before the first location data is received, in other words, before operation 410 of FIG. 4. Snapshot 800 shows default locations 861, 862, 863, 864 stored as candidate locations available for being selected as the second location.

At a subsequent time T1, the first location data has been received, for example according to operation 410. As such, snapshot 801 shows the first location as a dot 811. All stored default locations 861, 862, 863, 864 are still available, and shown as such.

At a subsequent time T2, a location 833 has been selected as the second location, as an example of operation 450. As such, snapshot 802 shows second location 863 with a checkmark. In addition, an arrow indicates that, for first location 811, second location 833 is being selected. All the default locations 861, 862, 863, 864 have not been selected, and therefore are shown with crossed-out marks.

At a subsequent time T3, the second location has been communicated, as an example of operation 460. In addition, the data of the first location 811 has been erased, as an example of operation 490 actually taking place. Moreover, second location 833 has been stored as an additional default location, for the next time operation 400 is performed. Now the next first location data is waited for, with more default locations stored as candidate locations.

Neither FIG. 7 nor FIG. 8 show which domains the first location, the second location, and the default locations belong in, and this is done for purposes of maintaining generality of these example. Anyone of the default locations may have been not chosen because it was in the wrong subset of domains. Or, any and all of the default locations may have been chosen initially to already be in the proper subset of domains, but some were not chosen due to unfavorable ranking.

Operational Examples of Embodiments

The above-described embodiments may be used to disguise address data, which can help protect the privacy of an entity at that address, protect its identity, and so on. There are a number of contexts where address data can be disguised for such purposes.

One such context is when it is desirable to determine accurately a tax due by an entity, in situations where the determination depends on the address of the entity. The context is applicable where the entity must provide its address, but there is the concern that then this address could be used to identify the entity, while the entity desires privacy, wants to protect its identity, and so on. The entity's address would be needed, because such a tax determination is very complex, as every location belongs in a web of tax jurisdictions, each of which may be imposing a tax on the entity. For example, for a single purchase by the entity, a sales tax and/or a use tax, an excise tax, and so on, may be imposed by a state, a county, a municipality, a city, and so on. This tax determination can be performed by highly specialized Software As A Service ("SaaS") providers, such as Avalara, Inc. For this tax determination to be performed in the prior art, a real, actual location ("first location") might have to be communicated to the SaaS provider. This communication may have even been across borders through which such information is not permitted to be transmitted or exported. Embodiments, however, can first generate an alternate but equivalent location ("second location") from the entity's actual location ("first location"). That second location can be tax-equivalent to the first location, in that it belongs to the exact same set of tax jurisdictions ("domains") as the first location, for example per the match column 351 of FIG. 3. Accordingly, instead of communicating the first location data of the entity's actual location, now one can communicate to the SaaS the second location data. The tax determination will thus be performed on the basis of the second location data instead of the first location data, and it will still be correct, because the second location is tax-equivalent to the first location. In addition, while performing the service of determining tax, the SaaS provider will never learn the first location, or the actual location of the entity, whose privacy will be thus protected better.

Figure 9:
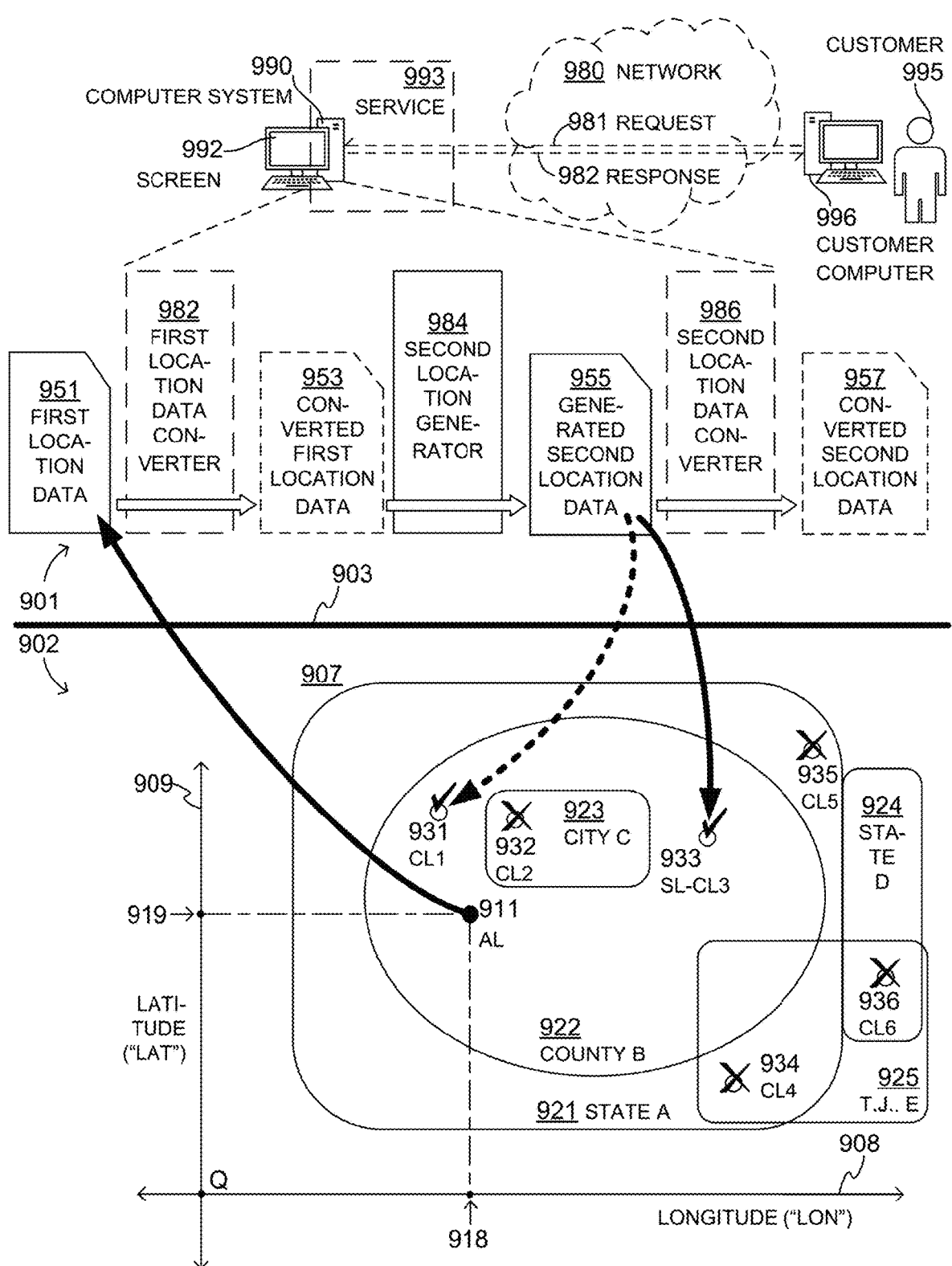
FIG. 9 presents two separate but related diagrams: the upper diagram repeats aspects of the upper diagram of FIG. 2, while the lower diagram is used to illustrate an operational example of embodiments.

Such operational examples of embodiments are now described in more detail. FIG. 9 presents a first upper diagram 901 and a second lower diagram 902 that are separated by a separator line 903. The diagrams 901 and 902 are linked by arrows that cross the separator line 903, and show salient conceptual connections between these two diagrams.

It will be recognized that the first diagram 901 has many components that can be implemented by analogous components of diagram 201 of FIG. 2. In particular, a computer system 990 has a screen 992, and components 982, 984, 986, similarly to what was described for computer system 290 having a screen 292, and components 282, 284, 286. The computer system 990 may be part of a service 993, and be accessible via a network 980. In particular, a customer 995 who uses a customer computer 996 may transmit a request 981, receive a response 982, and so on, similarly with what was described for service 293, network 280, customer 295, customer computer 296, request 281, and response 282. Customer 995 can be a vendor of items, or a functionality used by a vendor such as a Point of Sale (POS) functionality, an Enterprise Resource Planning (ERP) functionality, or a partner of a vendor such as an Electronic Market Place (EMP), and so on.

In this operational example, surface 907 is the earth as seen in the diagram 902. The surface 907 is substantially spherical, and the underlying radius of the earth is large enough so that certain small, local areas may be considered as flat.

A first location AL 911 is shown on the surface 907. The first location AL 911 is also known as the initial location and an entity's actual location. Locations such as first location AL 911 can be defined on the surface 907 as data that uses a system suitable for describing places on the surface 907. A suitable such system is addresses, such as the ones used to deliver mail by the country's Postal Service. Another such system is made from an axis 908 that points East-West, which can indicate geographic longitude, and an axis 909 that points North-South, which can indicate geographic latitude. These axes intersect at a point Q that is transferable to various locations. The geographic coordinate system (latitude, longitude) is, strictly speaking, a type of spherical coordinates. When taken locally, however, it can be thought of as a type of rectangular coordinates. As such, if first location AL 911 is a single point, it can be defined by data that are coordinate values of points 918, 919 on axes 908 and 909, respectively, and so on.

The surface 907 has a plurality of domains defined thereon. For this example, these domains correspond to tax jurisdictions. In this example the following sample domains are shown: State A 921, County B 922, City C 923, State D 924, and Tax Jurisdiction E 925. As can be seen, some of these domains are supersets or subsets of each other, some exclude each other, and some overlap with others. Not all possible domains are shown. For example, the country domain may include all of the domains shown in diagram 902, and so on.

Figure 10:
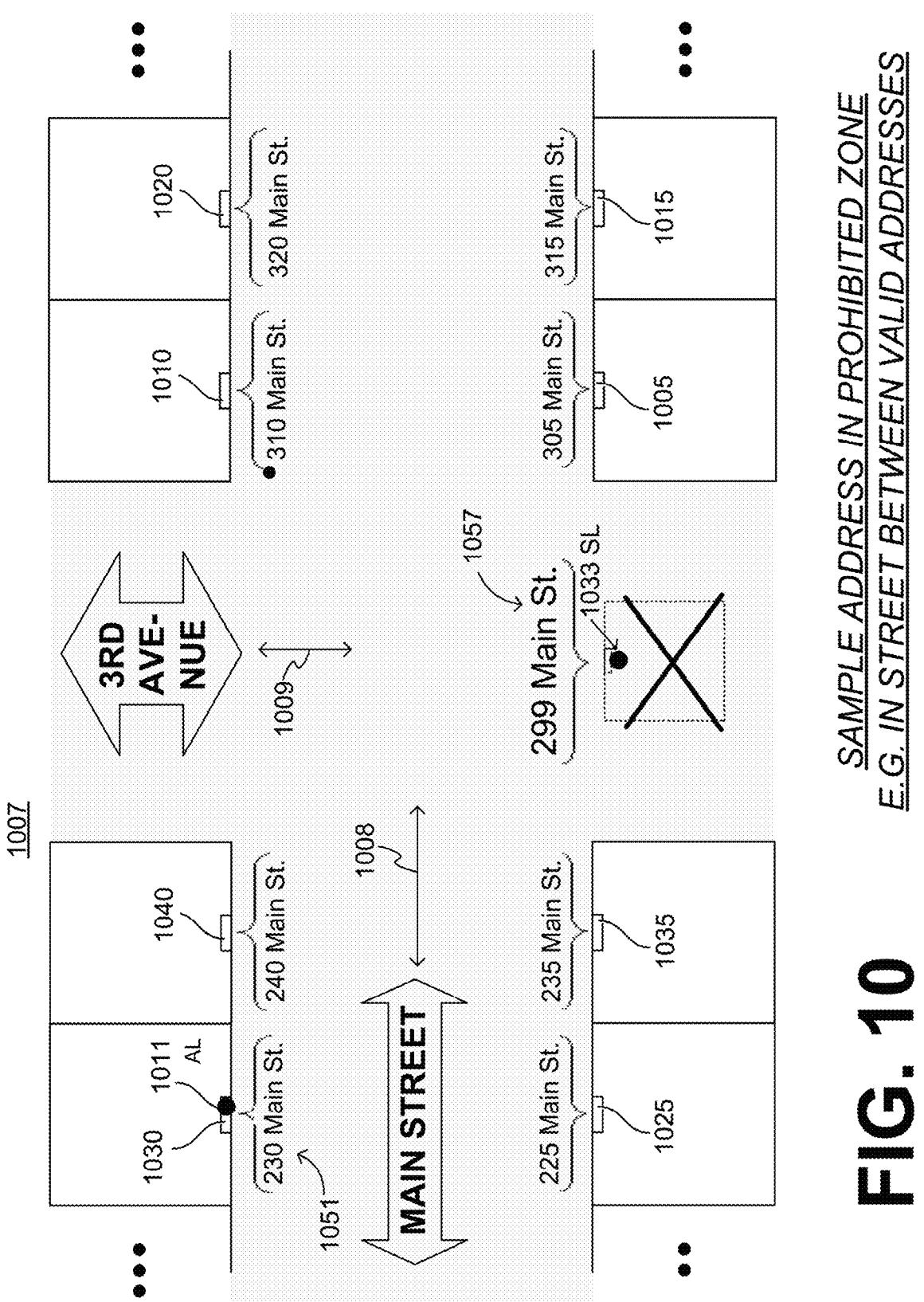
FIG. 10 is a diagram of a portion of a street map of a sample city, with an operational example of how, from an initial or first address, an alternate but tax-equivalent second address is generated according to embodiments, and further in an embodiment where the generated address is in a prohibited zone.

Referring to FIG. 10, an operational example is shown of how an entity's actual address can be disguised. FIG. 10 is a diagram of a portion 1007 of a street map of sample city, which is an example of a surface. The map portion 1007 shows buildings around the intersection of Main Street that lies along an East-West direction 1008, and 3rd Avenue that lies along a North-South direction 1009. Along Main street, buildings are indicated by their doors 1030, 1025, 1040, 1035, 1010, 1005, 1020, 1015. Each of these doors has an indicated Main street address. In particular, door 1030 has address 230 Main St., door 1025 has address 225 Main St., door 1040 has address 240 Main St., door 1035 has address 235 Main St., door 1010 has address 310 Main St., door 1005 has address 305 Main St., door 1020 has address 320 Main St., and door 1015 has address 315 Main St. Of course, all these designations are for a US version of this document. If rendered for a different country, the street and addresses of street map portion 1007 might have different names. For example, in a German version of this document, Main Street might be rendered instead as "Hauptstrasse", "Third Avenue" as "Drittenstrasse", and the addresses accordingly.

For the operational example of FIG. 10, a dot 1011 AL indicates the actual location of an entity. As such, the first location data is 1051 is the mailing address: "230 Main St.", which can be the first location data 951 in FIG. 9. Then the converted first location data 953 may be a latitude and a longitude of dot 1011 AL, which may be generated from prior knowledge of latitudes and longitudes of addresses.

Computer system 990, and it second location generator 984, may then generate the second location shown by a dot 1033 SL. In this example, this second location may be in terms of a latitude-longitude, or a street address. Even if not a street address directly, it can be the second converted location data 957 of FIG. 9. In the example of FIG. 10, the second converted location data 1057 could be the mailing address: "299 Main St."

A few things are immediately apparent about the example of FIG. 10 specifically. First, this is an example where the selected second location is further in a forbidden zone, namely in the street! That can further accentuate the notion that the actual location, i.e. the first location, is and should remain private. Second, it will be apparent that the map portion 1007 indicates the downtown of a city, and therefore is a different example than in diagram 902 where the actual location AL 911 is outside the City C 923.

Third, in FIG. 10 the second location is in the same street as the first location. That is generally not preferred when there is an effort to disguise the first location, as both addresses are on Main Street. For example, and using a coordinate system of streets, the second location could have been selected to be three streets to the north and two intersections to the east of the first location, approximately as may have been generated if one of vectors 561, 571 were used from the start at the actual location point AL 1011. And, the size of these vectors may depend on the local population density, less if the latter is larger, and so on. Regardless, in FIG. 10 the second location 1033 SL is close to the first location 1011 AL for two reasons. First, for purposes of fitting everything clearly into a single drawing. Second, to indicate that this may happen anyway as in FIG. 10 in certain circumstances. Such circumstances include where only a few default locations are provided for all possible first locations that are tax equivalent to this second location 1033 SL. For example, in cases where all default locations 761, . . . , 764 of FIG. 7 further belong in the same domains as each other and do not belong in the same domains as each other, they would all be tax-equivalent to each other. And any one of them could be used as a default location, and therefore also as a default address, for all possible first locations that are tax equivalent to it. Of course, in such cases further optimizations may be implemented, where a farther default location may have a higher ranking due to better desirability than one close to the original location, and so on.

Returning to the use case of computing sales tax for a transaction, an example is now described with reference to FIG. 11. The transaction includes data of a buyer, a seller, an item and so on. This data is shown in successive sample snapshots 1131, 1132, 1133 of a document, for which sales tax is eventually computed per comment A 1191. The data here is shown each time as aggregated and formatted in a document, but that is only for convenience of this example; the data could instead have been be presented and/or formatted otherwise, such as rows in a spreadsheet, etc.

In this particular example, in snapshot 1131 the transaction data is a transaction id number (ID), the buyer name (BAN), the buyer address (BAL), the seller name (SAN), the seller address (SAL), item information (ITM), a sales price (SP) and optional other data (OD). Other data could have included date of order, currency designation for the sales price, id number for any permit, and so on.

Per embodiments, snapshot 1132 is generated from snapshot 1131. It will be appreciated that snapshot 1132 is a de-identified version of snapshot 1131. Indeed, per comment B 1192, the buyer address (BAL) and the seller address (SAL) have been replaced with the buyer's tax-equivalent location (BEL), and the seller's tax-equivalent location (SEL) for example as per the above. As such, snapshot 1132 disguises the addresses of the buyer and the seller, and does not reveal them downstream in the process.

Furthermore, per comment C 1193, the buyer name (BAN) and the seller name (SAN) have been replaced with the buyer's code name (BCN) and the seller's code name (SCN), which can be arbitrary text strings. Names can be thus concealed according to embodiments by being replaced by code names that are generated for the actual names. Generation of one of the code name may include a random or quasi-random process. A code name may be used consistently for a client, or different code names may be used for different transactions of the same client. As such, snapshot 1132 conceals the names of the buyer and the seller, and does not reveal them downstream in the process.

Snapshot 1132 can be sent across a communications network 1160, which can be the internet. Snapshot 1132 can be thus sent to a remote destination, which can even be across a border 1166 through which, for example, transmission of sensitive information is restricted somehow. The restrictions could vary, ranging from total prohibition to permitting to sending data that makes no sense without context and/or is erased afterwards.

Then snapshot 1133 can be returned in response, even across border 1166, with sales tax ST having been added. It is noteworthy that the sales tax ST has been computed on the basis of addresses that are tax-equivalent to the actual addresses of the buyer and the seller, and therefore is accurate. At the same time, the service that computed the tax never learned the actual addresses of the buyer and the seller, nor their names for that matter.

Figure 11:
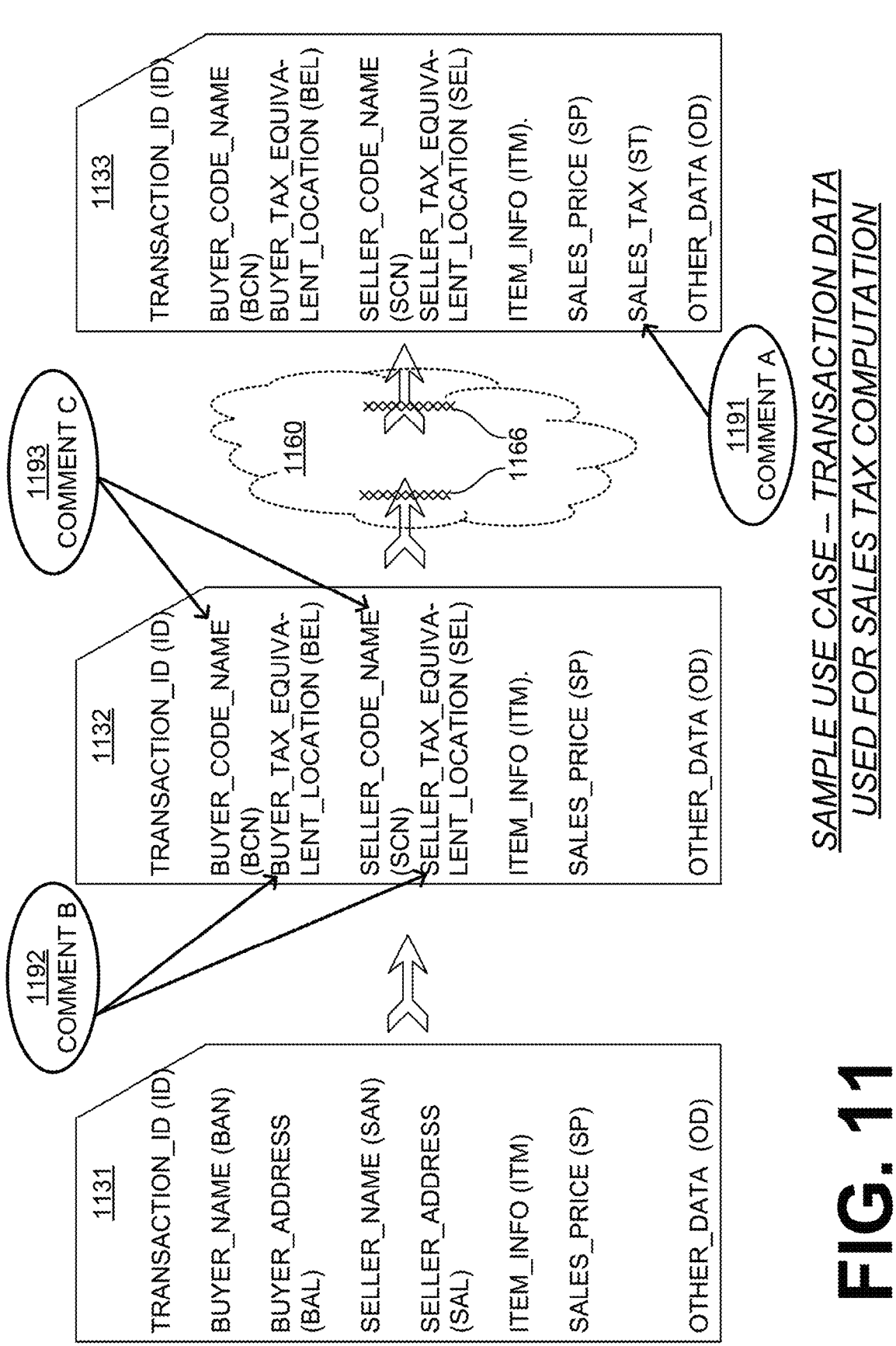
FIG. 11 is a diagram showing sample successive snapshots of a document containing transaction data, with addresses disguised and names concealed according to an operational example of embodiments.

What is not shown in FIG. 11 is the final reconstructed data. Such might be the data of snapshot 1131, along with the tax of snapshot 1133, provided as a document or otherwise.

It will be further recognized that snapshot 1132 need not have included anything for the names of the buyer and the seller, as long as the recipient across network 1160 is prepared for that. For example, the API call across network 1160 may have a variable like NO_NAMES that is normally set to zero. If, however, it is set to 1, no names are provided in the API call. Another variable may indicate whether the names are concealed, as in the example of FIG. 11. And, of course, concealing the name runs the risk that the one of the buyer and the seller is exempt from paying tax, but that will not be recognized.

Disguising addresses can be performed in a number of instances. In some embodiments, this can be performed according to prior rules, and/or if requested by settings. An example is now described.

Figure 12:
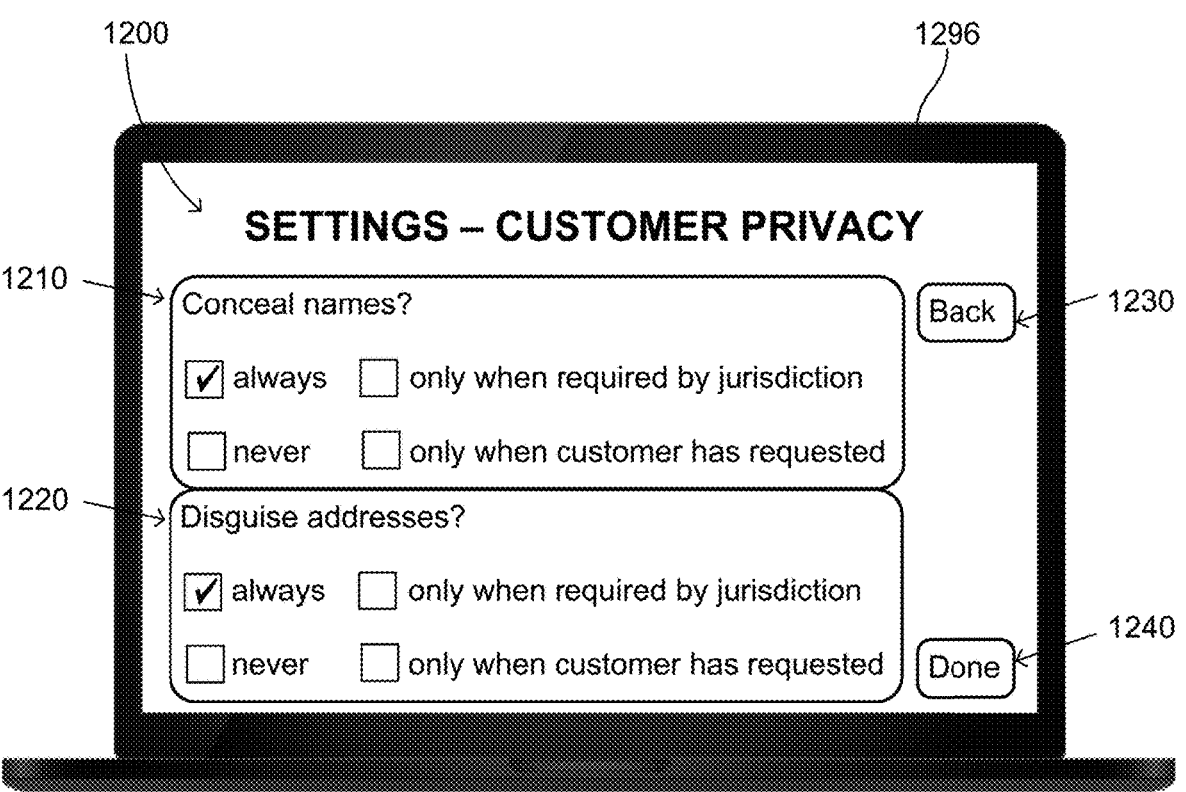
FIG. 12 is a diagram of a sample Graphical User Interface (GUI) where concealing a name and disguising an address may be requested to be performed according to embodiments.

FIG. 12 is a diagram of a screen 1296 of a customer computer. Screen 1296 displays a sample Graphical User Interface (GUI) 1200, which has four sections 1210, 1220, 1230, 1240.

Section 1210 further gives the user of screen 1296 the option to choose if and when names would be concealed. Four options are presented, "always", "only when required by the jurisdiction", e.g. from privacy rules of the applicable jurisdiction, "never" and "only when customer has requested". These could be the options of an intermediary, who deals with transactions of a vendor, and so on.

Section 1220 gives the user of screen 1296 the option to choose if and when addresses would be disguised. Four options are presented, similarly with the above. Section 1230 is a button for going back, and Section 1240 is a button for pressing when done with the choices of sections 1210, 1220.

Figure 13:
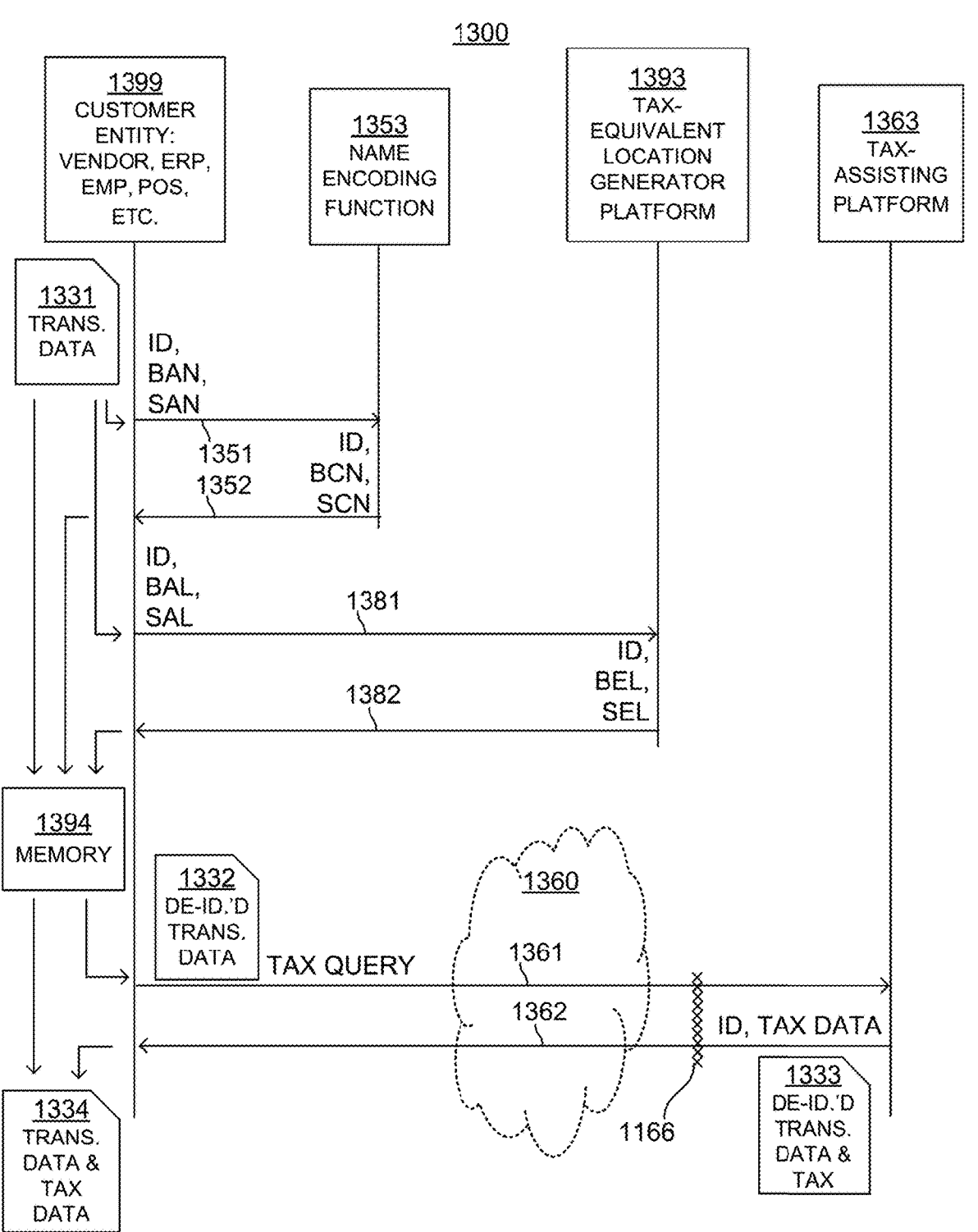
FIG. 13 is a sequence diagram of a sample sequence according to embodiments for generating the snapshots of FIG. 11.

FIG. 13 is a sequence diagram 1300 of a sample sequence according to embodiments for generating the snapshots of FIG. 11. Diagram 1300 shows a customer entity 1399 that can be as was described above for customer 995, together with computer functionality such as servers, etc. that support the customer 995. Customer entity 1399 may use a name encoding function 1353, a tax-equivalent location generator platform 1393, and a tax-assisting platform 1363. For purposes of FIG. 13 alone, it does not matter where the latter three functions are hosted with reference to customer entity 1399, but different examples of that are described later in this document.

For obtaining a sales tax on a transaction, customer entity 1399 may start with the transaction data. In this example, the transaction data is shown organized and formatted as a document 1331, although that formatting is not necessary. In practice, the transaction data of document 1331 can be the variables in snapshot 1131. Customer entity 1399 can store all elements of document 1331 in a memory 1394 of a computer of customer entity 1399, also for later reconstruction.

For ultimately concealing the names of the buyer (BAN) and the seller (SAN) in the transaction, customer entity 1399 may transmit a request 1351 to name encoding function 1353. The payload of request 1351 may be the variables BAN, SAN, and also optionally the transaction ID or another code number specially for the code name query of request 1351. In response to request 1351, name encoding function 1353 may transmit a response 1352. The payload of response 1352 can be the BCN, SCN, and also optionally also the ID or the other code number for confirmation and matching by the querying customer entity 1399. The learned BCN, SCN can be stored in memory 1394, also for later reconstruction.

For ultimately disguising the addresses of the buyer (BAL) and the seller (SAL) in the transaction, customer entity 1399 may transmit a request 1381 to tax-equivalent location generator platform 1393. The payload of request 1381 may be the variables BAL, SAL, and also optionally the transaction ID or another code number specially for the query of request 1381. In response to request 1381, tax-equivalent location generator platform 1393 may generate alternate addresses or locations BEL, SEL, for example as described earlier in this document. In addition, tax-equivalent location generator platform 1393 may transmit a response 1382. The payload of response 1382 can be the BEL, SEL, and also optionally also the ID or the other code number for confirmation and matching by the querying customer entity 1399. The learned BEL, SEL can be stored in memory 1394, also for later reconstruction.

For learning the tax due, customer entity 1399 may transmit a request 1361 to tax-assisting platform 1363. The payload of request 1361 is a tax query, and may include the variables of a document 1332, which can be as in snapshot 1132. It will be appreciated that document 1332 thus includes de-identified transaction data. Again, request 1361 may be transmitted via a network 1360, even across border 1166, without revealing names or true addresses. In response to request 1361, tax-assisting platform 1363 may transmit a response 1362. The payload of response 1362 can be the variables of document 1333, which can be as for snapshot 1133. The variable added is tax data, such as ST. It will be appreciated that document 1333 thus includes de-identified transaction data plus the tax.

Afterwards customer entity 1399 may reconstruct the data on its side, correcting for the concealment of the name and for the disguising of the address by retrieving the true data from memory 1394. For example, it can use the transaction data of document 1331, and add to it the tax learned from document 1333, to create a new document 1334 with proper data, and so on.

Different possible hosting arrangements of functionalities of FIG. 13 are now presented.

Figure 14:
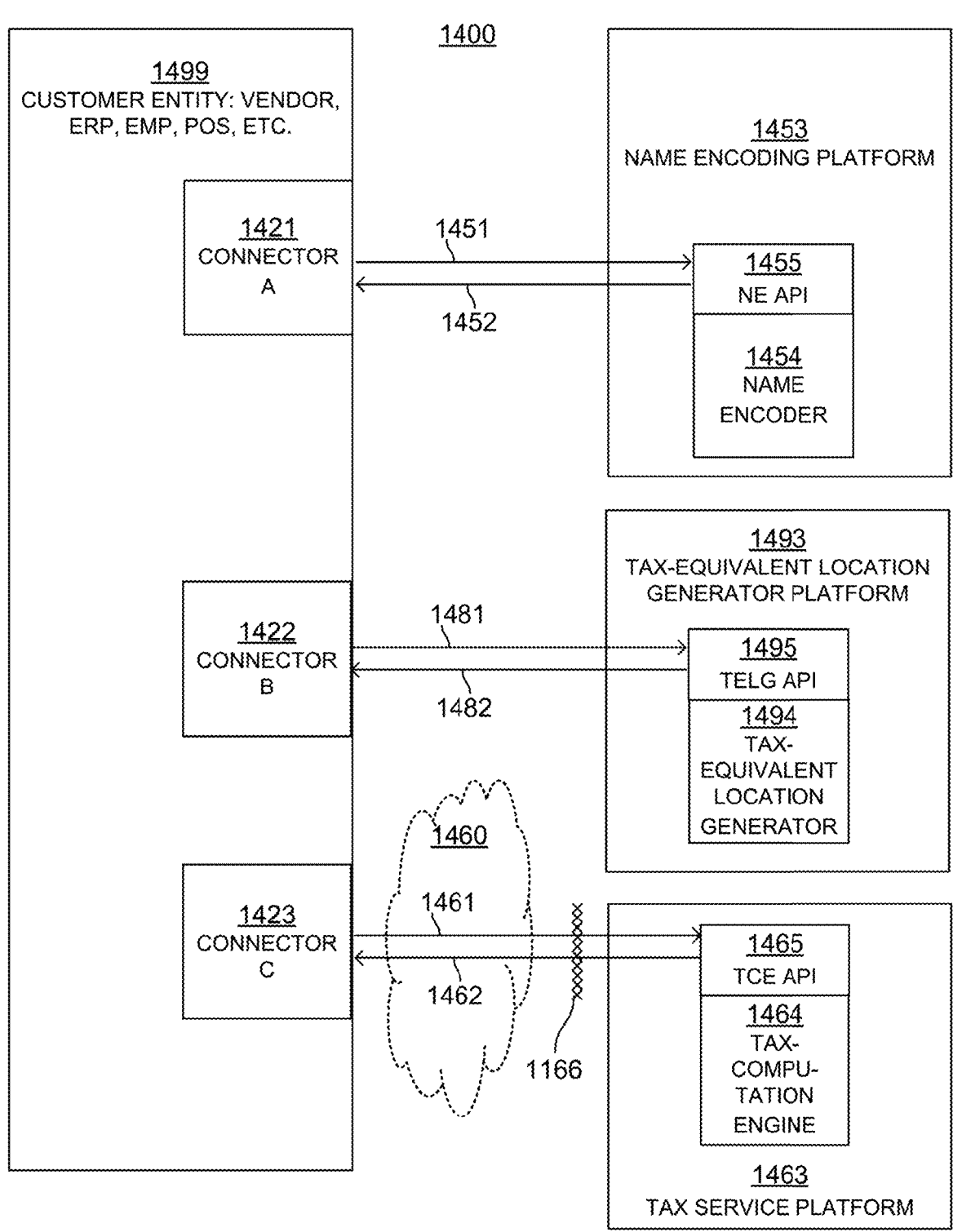
FIG. 14 is a diagram of a first sample arrangement of the functionalities of FIG. 13, according to embodiments.

FIG. 14 is a diagram of a sample arrangement 1400 of the functionalities of FIG. 13. A customer entity 1499 can be as described for customer entity 1399. Each of a name encoding platform 1453, a tax-equivalent location generator platform 1493, and a tax service platform 1463 are hosted separately from the customer entity 1499.

The customer entity 1499 has a connector A 1421 that can communicate with the name encoding platform 1453, for example over a network (not shown). In particular, connector A 1421 can send a request 1451 to an NE API 1455 that communicates with a name encoder 1454. Here "NE" is an acronym for Name Encoder, and "API" stands for Application Programming Interface. Similarly with request 1351, request 1451 can carry real names like the BAN and the SAN, and name encoder 1454 may generate the BCN and the SCN. Then name encoder 1454 may cause the NE API 1455 to transmit to the customer entity 1499 a response 1452 that communicates the BCN and the SCN, similarly with response 1352. It should be noted that the actual names alone would be out of context, and therefore it might be permissible for request 1451 to cross border 1166. Regardless, if such is impermissible, then name encoding platform 1453 should be within the same borders as customer entity 1499.

The customer entity 1499 also has a connector B 1422 that can communicate with the tax-equivalent location generator platform 1493, for example over a network (not shown). In particular, connector B 1422 can send a request 1481 to a TELG API 1495 that communicates with a tax-equivalent location generator 1494. Here "TELG" is an acronym for Tax-Equivalent Location Generator. Similarly with request 1381, request 1481 can carry real addresses like the BAL and the SAL, and tax-equivalent location generator 1494 may generate the BEL and the SEL. Then tax-equivalent location generator 1494 may cause the TELG API 1495 to transmit to the customer entity 1499 a response 1482 that communicates the BEL and the SEL, similarly with response

1382. It should be noted that the actual addresses alone would be out of context, and therefore it might be permissible for request 1481 to cross border 1166. Regardless, if such is impermissible, then tax-equivalent location generator platform 1493 should be within the same borders as customer entity 1499.

The customer entity 1499 further has a connector C 1423 that can communicate with the tax service platform 1463, for example over a network 1460 that can be as network 1360. In particular, connector C 1423 can send a request 1461 to a TCE API 1465 that communicates with a tax computation engine 1464. Here "TCE" is an acronym for Tax Computation Engine. Similarly with request 1381, request 1461 can carry concealed names and disguised addresses, and tax computation engine 1464 may determine the sales tax (ST) due, and/or other tax information. Then the tax computation engine 1464 may cause the TCE API 1465 to transmit to the customer entity 1499 a response 1462 that communicates the ST, similarly with response 1362.

Figure 15:
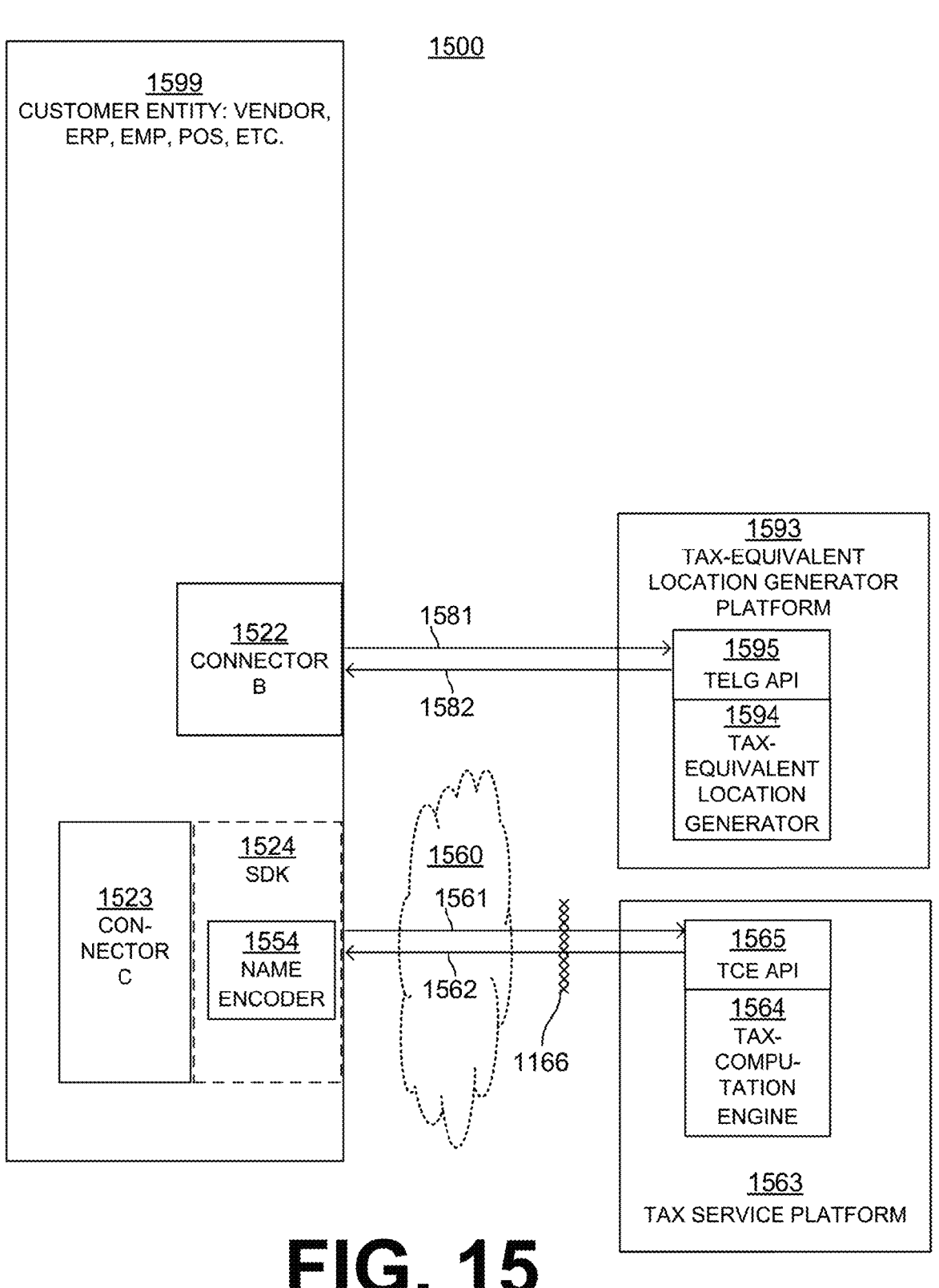
FIG. 15 is a diagram of a second sample arrangement of the functionalities of FIG. 13, according to embodiments.

FIG. 15 is a diagram of a sample arrangement 1500 of the functionalities of FIG. 13. A customer entity 1599 can be as described for customer entity 1399. Each of a tax-equivalent location generator platform 1593, and a tax service platform 1563 are hosted separately from the customer entity 1599.

The customer entity 1599 has a connector B 1522 that can communicate with the tax-equivalent location generator platform 1593, for example over a network (not shown). In particular, connector B 1522 can send a request 1581 to a TELG API 1595 that communicates with a tax-equivalent location generator 1594. Similarly with request 1381, request 1581 can carry real addresses like the BAL and the SAL, and tax-equivalent location generator 1594 may generate the BEL and the SEL. Then tax-equivalent location generator 1594 may cause the TELG API 1595 to transmit to the customer entity 1599 a response 1582 that communicates the BEL and the SEL, similarly with response 1382.

The customer entity 1599 also has a connector C 1523, and a name encoder 1554, which can operate as name encoder 1454, but locally to the customer entity 1599. As such, name encoder 1554 can generate the BCN and the SCN. In embodiments, name encoder 1554 is part of a software development kit (SDK) 1524 that can be configured by a user of the customer entity 1599, as also possibly assisted and/or supported by an operator of either the tax-equivalent location generator platform 1593 or the tax service platform 1563.

The connector C 1523 can further communicate with the tax service platform 1563 across border 1166, for example over a network 1560 that can be as network 1360. In particular, connector C 1523 can send a request 1561 to a TCE API 1565 that communicates with a tax computation engine 1564. Similarly with request 1381, request 1561 can carry concealed names and disguised addresses, and tax computation engine 1564 may determine the sales tax (ST) due, and/or other tax information. Then the tax computation engine 1564 may cause the TCE API 1565 to transmit to the customer entity 1599 a response 1562 that communicates the ST, similarly with response 1362.

Figure 16:
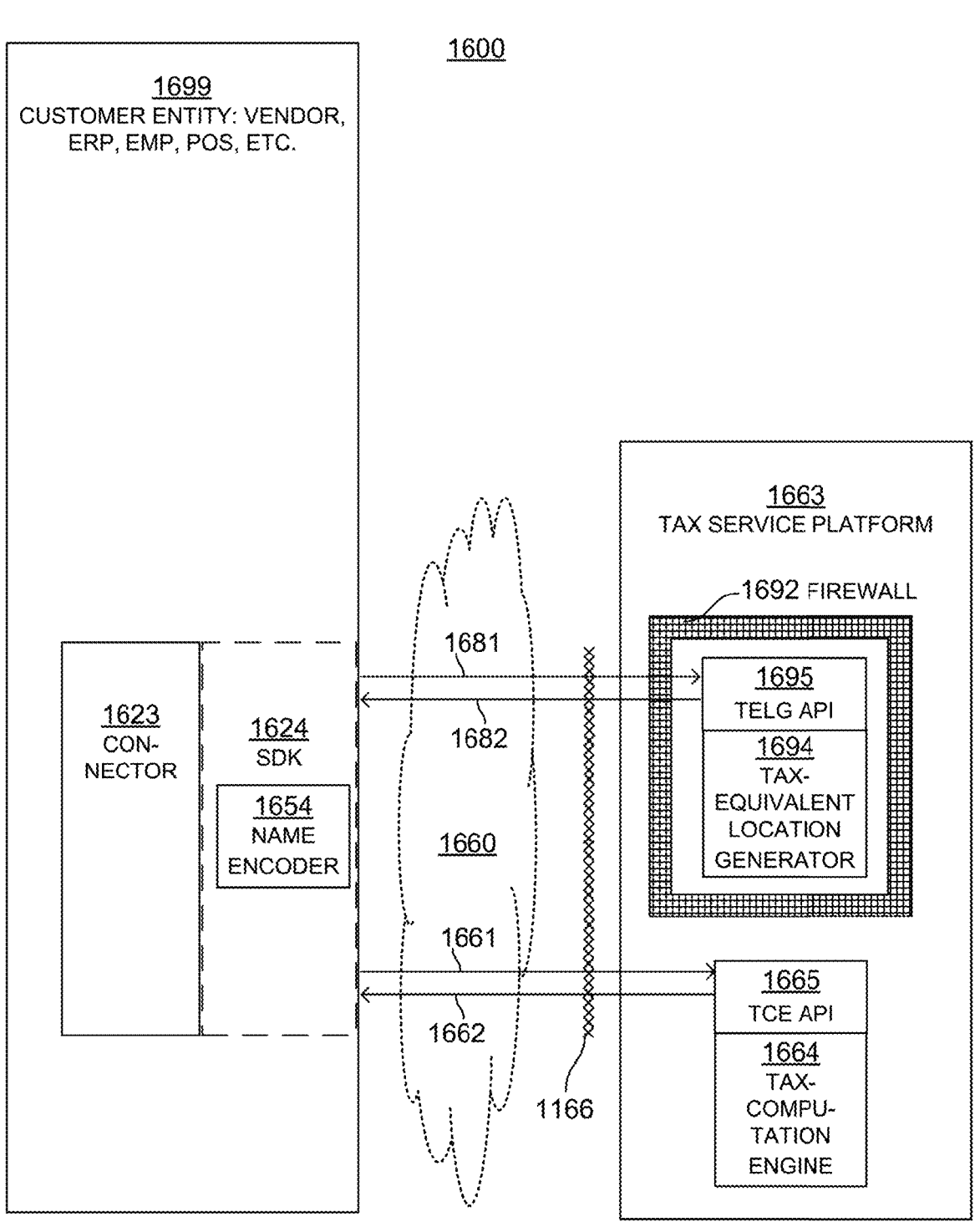
FIG. 16 is a diagram of a third sample arrangement of the functionalities of FIG. 13, according to embodiments.

FIG. 16 is a diagram of a sample arrangement 1600 of the functionalities of FIG. 13. A customer entity 1699 can be as described for customer entity 1399. A tax service platform 1663 is hosted separately from the customer entity 1699. A TELG API 1695 and a tax-equivalent location generator 1694 are hosted by the tax service platform 1663, albeit behind a firewall 1692.

The customer entity 1699 has a connector 1623, and a name encoder 1654, which can operate as name encoder

1454, but locally to the customer entity 1699. As such, name encoder 1654 can generate the BCN and the SCN. In embodiments, name encoder 1654 is part of a software development kit (SDK) 1624 that can be configured by a user of the customer entity 1699, as also possibly assisted and/or supported by an operator of the tax service platform 1663.

The connector 1623 can communicate with the tax service platform 1663, for example across border 1166 over a network 1660 that can be as network 1360. First, the connector 1623 can send a request 1681 to the TELG API 1695 that communicates with the tax-equivalent location generator 1694. Similarly with request 1381, request 1681 can carry real addresses like the BAL and the SAL, and tax-equivalent location generator 1694 may generate the BEL and the SEL. Then tax-equivalent location generator 1694 may cause the TELG API 1695 to transmit to the customer entity 1699 a response 1682 that communicates the BEL and the SEL, similarly with response 1382.

Second, connector 1623 can communicate for computing the tax. It can be optionally further arranged to wait for this communication to happen for enough time, until the BAL and the SAL has been erased from all memories within firewall 1692.

When ready, connector 1623 may send a request 1661 to a TCE API 1665 that communicates with a tax computation engine 1664. Similarly with request 1361, request 1661 can carry concealed names and disguised addresses, and tax computation engine 1664 may determine the sales tax (ST) due, and/or other tax information. Then the tax computation engine 1664 may cause the TCE API 1665 to transmit to the customer entity 1699 a response 1662 that communicates the ST, similarly with response 1362.

Figure 17:
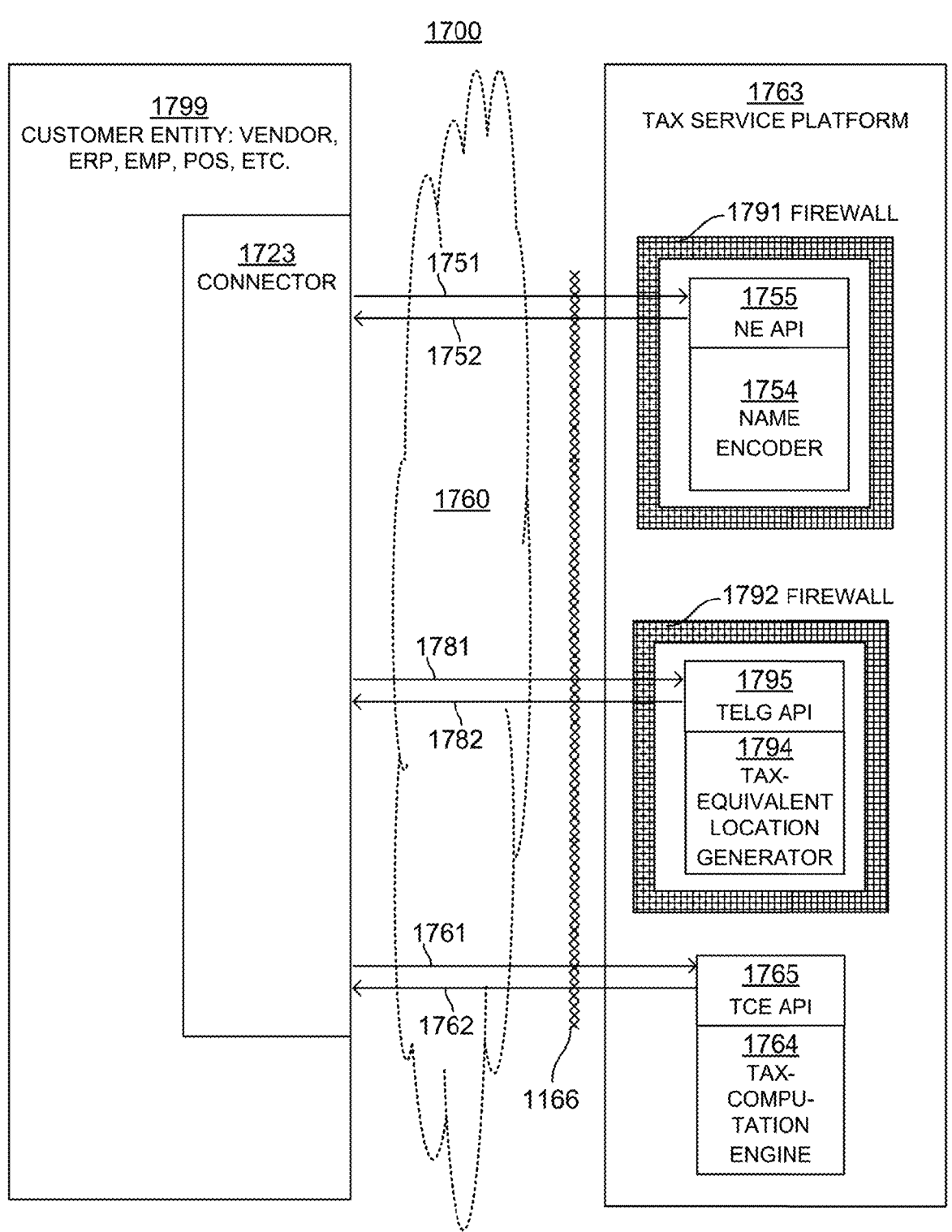
FIG. 17 is a diagram of a fourth sample arrangement of the functionalities of FIG. 13, according to embodiments.

FIG. 17 is a diagram of a sample arrangement 1700 of the functionalities of FIG. 13. A customer entity 1799 can be as described for customer entity 1399. A tax service platform 1763 is hosted separately from the customer entity 1799. An NE API 1755 and a name encoder 1754 are hosted by the tax service platform 1763, albeit behind a firewall 1791. A TELG API 1795 and a tax-equivalent location generator 1794 are hosted by the tax service platform 1763, albeit behind a firewall 1792.

The customer entity 1799 has a connector 1723. The connector 1723 can communicate with the tax service platform 1763, for example across border 1166 over a network 1760 that can be as network 1360.

First, the connector 1723 can send a request 1751 to the NE API 1755 that communicates with the name encoder 1754. Similarly with request 1351, request 1751 can carry real names like the BAN and the SAN, and name encoder 1754 may generate the BCN and the SCN. Then name encoder 1754 may cause the NE API 1755 to transmit to the customer entity 1799 a response 1752 that communicates the BCN and the SCN, similarly with response 1352.

Second, connector 1723 can communicate for obtaining disguised addresses. It can be optionally further arranged to wait for this communication to happen for enough time, until the BAN and the SAN has been erased from all memories within firewall 1791.

When ready, connector 1723 may send a request 1781 to the TELG API 1795 that communicates with the tax-equivalent location generator 1794. Similarly with request 1381, request 1781 can carry real addresses like the BAL and the SAL, and tax-equivalent location generator 1794 may generate the BEL and the SEL. Then tax-equivalent location generator 1794 may cause the TELG API 1795 to transmit to the customer entity 1799 a response 1782 that communicates the BEL and the SEL, similarly with response 1382.

Third, connector 1723 can communicate for computing the tax. It can be optionally further arranged to wait for this communication to happen for enough time, until the BEL and the SEL has been erased from all memories within firewall 1792. The above two operations may be interchanged.

When ready, connector 1723 may send a request 1761 to a TCE API 1765 that communicates with a tax computation engine 1764. Similarly with request 1361, request 1761 can carry concealed names and disguised addresses, and tax computation engine 1764 may determine the sales tax (ST) due, and/or other tax information. Then the tax computation engine 1764 may cause the TCE API 1765 to transmit to the customer entity 1799 a response 1762 that communicates the ST, similarly with response 1362.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, component or process that are identical or at least similar or related. Where made, such a further effort was not required, but was nevertheless made gratuitously so as to accelerate comprehension by the reader. Even where made in this document, such a further effort might not have been made completely consistently for all of the versions or embodiments that are made possible by this description. Accordingly, the description controls in defining an item, aspect, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for"

or "steps for" are expressly used in the claims. Accordingly, if these words are not used in a claim, then that claim is not intended to be construed by the inventor(s) in accordance with 35 U.S.C. § 112(f).

What is claimed is:

1. A non-transitory computer-readable storage medium having computer-executable instructions stored thereon that, when executed by at least one processor, cause operations to be performed, the operations comprising:

receiving first location data that defines a first location on a surface, the surface having domains defined thereon;

looking up stored data about an extent of the domains on the surface;

querying whether or not the first location belongs in at least some of the domains;

discerning, in response to the querying, that the first location belongs in a first one of the domains but does not belong in a second one of the domains;

generating second location data that defines the second location on the surface, the second location selected so as to not overlap with the first location, the second location selected so as to belong in the first domain but to not belong in the second domain; and outputting the second location data, in which:

the first data is received via a network as a payload of a request, and the second location data is output via a network as a payload of a response that is transmitted responsive to the request.

2. The non-transitory computer-readable storage medium of claim 1, in which:

the surface is flat.

3. The non-transitory computer-readable storage medium of claim 1, in which:

the surface is curved.

4. The non-transitory computer-readable storage medium of claim 1, in which:

the surface is substantially spherical.

5. The non-transitory computer-readable storage medium of claim 1, in which:

the first location data uses one of rectangular coordinates and spherical coordinates.

6. The non-transitory computer-readable storage medium of claim 1, in which:

the received first location data uses a first coordinate system, the operations further comprise: converting the received first location data so that it uses a second coordinate system distinct from the first coordinate system, and in which the querying is performed using the converted first location data.

7. The non-transitory computer-readable storage medium of claim 1, in which the operations further comprise:

discerning, in response to the querying, a first subset of all of the domains that the first location belongs in, the first subset including the first domain, and in which the second location is further selected so as to belong in all the domains of the first subset.

8. The non-transitory computer-readable storage medium of claim 7, in which the operations further comprise:

further discerning, in response to the querying, a second subset of at least two of the domains that the first location does not belong in, the second subset including the second domain, and in which the second location is further selected so as to not belong in any the domains of the second subset.

9. The non-transitory computer-readable storage medium of claim 8, in which:

the second subset includes at least three domains.

10. The non-transitory computer-readable storage medium of claim 1, in which:

the generated second location data uses a first coordinate system, and the operations further comprise: converting the generated second location data so that it uses a second coordinate system distinct from the first coordinate system, and in which the output second location data uses the second coordinate system.

11. The non-transitory computer-readable storage medium of claim 1, in which:

the first location data uses a first coordinate system, and the outputted second location data uses a second coordinate system distinct from the first coordinate system.

12. The non-transitory computer-readable storage medium of claim 1, in which:

the first location data uses a certain coordinate system, and the first location data defines a single point on the surface according to the certain coordinate system.

13. A non-transitory computer-readable storage medium having computer-executable instructions stored thereon that, when executed by at least one processor, cause operations to be performed, the operations comprising:

receiving first location data that defines a first location on a surface, the surface having domains defined thereon, in which the received first location data becomes temporarily stored in a memory of a computer system;

rendering the first location data irretrievable from the memory;

looking up stored data about an extent of the domains on the surface;

querying whether or not the first location belongs in at least some of the domains;

discerning, in response to the querying, that the first location belongs in a first one of the domains but does not belong in a second one of the domains;

generating second location data that defines the second location on the surface, the second location selected so as to not overlap with the first location, the second location selected so as to belong in the first domain but to not belong in the second domain; and outputting the second location data.

14. The non-transitory computer-readable storage medium of claim 13, in which:

the first location data uses a certain coordinate system, and the first location data defines a single point on the surface according to the certain coordinate system.

15. The non-transitory computer-readable storage medium of claim 13, in which:

the second location data uses a certain coordinate system, and the second location data defines a single point on the surface according to the certain coordinate system.

16. The non-transitory computer-readable storage medium of claim 13, in which:

one of the first location and the second location is a place that has a non-zero area on the surface.

17. The non-transitory computer-readable storage medium of claim 13, in which:

the first location has a non-zero area on the surface, the second location has a non-zero area on the surface, and the second location can be fitted entirely within a test circle of a certain diameter, the test circle farther from any point of the first location than the certain diameter.

18. The non-transitory computer-readable storage medium of claim 13, in which:

the surface defines a forbidden zone, the first location known to be prohibited from being in the forbidden zone, but the second location is selected to be in the forbidden zone.

19. The non-transitory computer-readable storage medium of claim 13, in which the operations further comprise:

looking up stored data that defines valid zones on the surface, the first location required to be in one of the valid zones; and the second location is selected to be between two adjacent ones of the valid zones.

20. The non-transitory computer-readable storage medium of claim 13, in which:

the second location is selected by a generating function that uses the first location data to point to at least a vicinity for the second location.

21. The non-transitory computer-readable storage medium of claim 20, in which:

the generating function uses the first location data to point to the second location.

22. The non-transitory computer-readable storage medium of claim 20, in which:

the generating function uses at least one random variable.

23. The non-transitory computer-readable storage medium of claim 20, in which:

the generating function forces the second location to be within a certain range of distances from the first location.

24. The non-transitory computer-readable storage medium of claim 20, in which:

the generating function forces the second location to be at a certain general direction from the first location.

25. The non-transitory computer-readable storage medium of claim 20, in which:

the first location data uses a coordinate system that employs two perpendicular axes, and the generating function forces the second location to be at a certain general direction from the first location, the certain general direction being at a random angle that is at least 20 degrees away from each of the axes.

26. The non-transitory computer-readable storage medium of claim 13, in which the generating includes:

choosing candidate location data that defines a candidate location on the surface; and determining whether or not the candidate location meets a selection criterion, in which the candidate location data is generated as the second location data responsive to the candidate location meeting the selection criterion.

27. The non-transitory computer-readable storage medium of claim 26, in which:

the selection criterion includes that the candidate location belongs in the first domain but does not belong in the second domain.

28. The non-transitory computer-readable storage medium of claim 26, in which:

the candidate location is selected by a generating function that uses the first location data.

29. The non-transitory computer-readable storage medium of claim 26, in which:

the surface defines a forbidden zone, the first location known to be prohibited from being in the forbidden zone, but the candidate location is in the forbidden zone.

30. The non-transitory computer-readable storage medium of claim 26, in which the operations further comprise:

storing in a memory and prior to receiving the first location data, the candidate location data.

31. The non-transitory computer-readable storage medium of claim 13, in which the generating further includes:

choosing a plurality of candidate location data that respectively define candidate locations on the surface; and ranking the plurality of the candidate locations according to at least one desirability criterion, and in which the second location is selected as the one of the candidate locations that has been thus ranked the highest.

32. The non-transitory computer-readable storage medium of claim 31, in which:

the desirability criterion includes that the candidate location belongs in the first domain but does not belong in the second domain.

33. The non-transitory computer-readable storage medium of claim 31, in which:

the candidate locations are selected by a generating function that uses the first location data.

34. The non-transitory computer-readable storage medium of claim 31, in which:

the surface defines a forbidden zone, the first location known to be prohibited from being in the forbidden zone, but one or more of the candidate locations are in the forbidden zone.

35. The non-transitory computer-readable storage medium of claim 31, in which the operations further comprise:

storing in a memory and prior to receiving the first location data, the plurality of candidate location data.

36. The non-transitory computer-readable storage medium of claim 13, in which the operations further comprise:

storing in a memory and prior to receiving the first location data, default location data that defines a default location on the surface; and in which the second location data is the default location data.

37. The non-transitory computer-readable storage medium of claim 36, in which:

the surface defines a forbidden zone, the first location known to be prohibited from being in the forbidden zone, but one or more of the candidate locations are in the forbidden zone.

38. The non-transitory computer-readable storage medium of claim 13, in which the operations further comprise:

storing in a memory and prior to receiving the first location data, a plurality of default location data that defines a plurality of default locations on the surface; and in which the second location is not any of the default locations; and storing in a memory, the second location data as additional default data in the memory.

39. The non-transitory computer-readable storage medium of claim 38, in which:

the surface includes a forbidden zone, the first location known to be prohibited from being in the forbidden zone, but the second location is in the forbidden zone.

\* \* \* \* \*